US008711948B2

(12) United States Patent
Tu et al.

(10) Patent No.: US 8,711,948 B2
(45) Date of Patent: Apr. 29, 2014

(54) MOTION-COMPENSATED PREDICTION OF INTER-LAYER RESIDUALS

(75) Inventors: Chengjie Tu, Sammamish, WA (US); Sridhar Srinivasan, Shanghai (CN); Shankar Regunathan, Bellevue, WA (US); Shijun Sun, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 12/077,768

(22) Filed: Mar. 21, 2008

(65) Prior Publication Data

US 2009/0238279 A1  Sep. 24, 2009

(51) Int. Cl.
*H04N 7/12*     (2006.01)

(52) U.S. Cl.
USPC ............. 375/240.26; 375/240.13; 375/240.21

(58) Field of Classification Search
None
See application file for complete search history.

(56) References Cited

U.S. PATENT DOCUMENTS

| | | |
|---|---|---|
| 5,136,377 A | 8/1992 | Johnston et al. |
| 5,300,949 A | 4/1994 | Rodriguez et al. |
| 5,414,469 A | 5/1995 | Gonzales et al. |
| 5,565,920 A | 10/1996 | Lee et al. |
| 5,611,038 A | 3/1997 | Shaw et al. |
| 5,764,296 A | 6/1998 | Shin |
| RE35,910 E | 9/1998 | Nagata et al. |
| 5,821,986 A | 10/1998 | Yuan et al. |
| 5,828,421 A | 10/1998 | Boyce et al. |
| 5,864,637 A | 1/1999 | Liu et al. |
| 5,970,173 A | 10/1999 | Lee et al. |
| 6,002,801 A | 12/1999 | Strongin et al. |
| 6,104,434 A | 8/2000 | Nakagawa et al. |
| 6,157,396 A | 12/2000 | Margulis et al. |
| 6,229,570 B1 | 5/2001 | Bugwadia et al. |

(Continued)

FOREIGN PATENT DOCUMENTS

| | | |
|---|---|---|
| CN | 1378384 | 11/2002 |
| CN | 1465193 | 12/2003 |

(Continued)

OTHER PUBLICATIONS

Catmull et al., "A Class of Local Interpolating Splines," Computer Aided Geometric Design, Academic Press, pp. 317-326 (Mar. 1974).

(Continued)

*Primary Examiner* — Ayaz Sheikh
*Assistant Examiner* — Faiyazkhan Ghafoerkhan
(74) *Attorney, Agent, or Firm* — Aaron Chatterjee; Andrew Sanders; Micky Minhas

(57) ABSTRACT

Techniques and tools are described for scalable video encoding and decoding. In some embodiments, an encoding tool encodes base layer video and outputs encoded base layer video in a base layer bit stream. The encoding tool encodes inter-layer residual video (representing differences between input video and reconstructed base layer video) using motion compensation relative to previously reconstructed inter-layer residual video. For the inter-layer residual video, the encoding tool outputs motion information and motion-compensated prediction residuals in an enhancement layer bit stream. A decoding tool receives the base layer bit stream and enhancement layer bit stream, reconstructs base layer video, reconstructs inter-layer residual video, and combines the reconstructed base layer video and reconstructed inter-layer residual video. Using motion compensation for the inter-layer residual video facilitates the use of separate motion vectors and separate codecs for the base layer video and inter-layer residual video.

15 Claims, 9 Drawing Sheets

(56) References Cited

U.S. PATENT DOCUMENTS

| | | |
|---|---|---|
| 6,239,847 B1 | 5/2001 | Deierling |
| 6,259,741 B1 | 7/2001 | Chen et al. |
| 6,339,434 B1 | 1/2002 | West et al. |
| 6,418,166 B1 | 7/2002 | Wu et al. |
| 6,456,663 B1 | 9/2002 | Kim |
| 6,499,060 B1 | 12/2002 | Wang et al. |
| 6,501,484 B1 | 12/2002 | Porter |
| 6,510,177 B1 | 1/2003 | De Bonet et al. |
| 6,529,631 B1 | 3/2003 | Peterson et al. |
| 6,535,555 B1 | 3/2003 | Bordes et al. |
| 6,600,785 B1 | 7/2003 | Nishigori et al. |
| 6,678,424 B1 | 1/2004 | Ferguson |
| 6,700,933 B1 | 3/2004 | Wu et al. |
| 6,728,317 B1 | 4/2004 | Demos |
| 6,823,014 B2 | 11/2004 | Kim |
| 6,873,368 B1 | 3/2005 | Yu et al. |
| 6,937,291 B1 | 8/2005 | Gryskiewicz |
| 6,992,725 B2 | 1/2006 | Mohsenian |
| 6,993,078 B2 | 1/2006 | Hall et al. |
| 7,010,037 B2 | 3/2006 | Ye et al. |
| 7,072,525 B1 | 7/2006 | Covell |
| 7,154,952 B2 | 12/2006 | Tourapis et al. |
| 7,200,275 B2 | 4/2007 | Srinivasan et al. |
| 7,233,362 B2 | 6/2007 | Wu |
| 7,317,759 B1 | 1/2008 | Turaga et al. |
| 7,375,767 B2 | 5/2008 | Lee et al. |
| 7,570,834 B2 | 8/2009 | Deshpande |
| 7,653,133 B2 | 1/2010 | Woods et al. |
| 7,747,094 B2 | 6/2010 | Sekiguchi et al. |
| 7,956,930 B2 | 6/2011 | Sullivan |
| 2002/0037047 A1* | 3/2002 | Van Der Schaar et al. ................. 375/240.12 |
| 2002/0064226 A1 | 5/2002 | Bauer et al. |
| 2002/0159484 A1 | 10/2002 | Azizoglu et al. |
| 2002/0181583 A1 | 12/2002 | Corbera |
| 2002/0181586 A1 | 12/2002 | Kondo et al. |
| 2002/0186890 A1 | 12/2002 | Lee et al. |
| 2002/0186894 A1 | 12/2002 | Ferguson |
| 2003/0026339 A1 | 2/2003 | Presquet-Popescu et al. |
| 2003/0099298 A1 | 5/2003 | Rose et al. |
| 2003/0133500 A1 | 7/2003 | Auwera et al. |
| 2003/0161401 A1 | 8/2003 | Shen et al. |
| 2004/0013195 A1 | 1/2004 | Panusopone et al. |
| 2004/0042549 A1 | 3/2004 | Huang et al. |
| 2004/0101058 A1 | 5/2004 | Sasai et al. |
| 2004/0208247 A1 | 10/2004 | Barrau et al. |
| 2004/0213345 A1 | 10/2004 | Holcomb et al. |
| 2004/0264567 A1 | 12/2004 | Xu et al. |
| 2005/0018771 A1 | 1/2005 | Bourge et al. |
| 2005/0157791 A1 | 7/2005 | Sun |
| 2005/0195896 A1 | 9/2005 | Huang et al. |
| 2005/0195900 A1 | 9/2005 | Han |
| 2005/0259729 A1* | 11/2005 | Sun ................. 375/240.1 |
| 2005/0281333 A1 | 12/2005 | Ghanbari |
| 2006/0008006 A1 | 1/2006 | Cha et al. |
| 2006/0013305 A1* | 1/2006 | Sun ................. 375/240.12 |
| 2006/0072672 A1 | 4/2006 | Lin et al. |
| 2006/0072673 A1 | 4/2006 | Lin et al. |
| 2006/0083303 A1 | 4/2006 | Han et al. |
| 2006/0083308 A1* | 4/2006 | Schwarz et al. ........ 375/240.16 |
| 2006/0093036 A1 | 5/2006 | Park et al. |
| 2006/0133485 A1 | 6/2006 | Park et al. |
| 2006/0133503 A1 | 6/2006 | Park et al. |
| 2006/0146937 A1 | 7/2006 | Ye et al. |
| 2006/0153465 A1 | 7/2006 | Zhang et al. |
| 2006/0159173 A1 | 7/2006 | Ye et al. |
| 2006/0165302 A1* | 7/2006 | Han et al. ................. 382/240 |
| 2006/0193388 A1 | 8/2006 | Woods et al. |
| 2006/0262985 A1 | 11/2006 | Chen et al. |
| 2006/0268991 A1 | 11/2006 | Segall et al. |
| 2006/0285594 A1 | 12/2006 | Kim et al. |
| 2007/0014349 A1* | 1/2007 | Bao et al. ................ 375/240.1 |
| 2007/0053431 A1 | 3/2007 | Cammas et al. |
| 2007/0091997 A1 | 4/2007 | Fogg et al. |
| 2007/0121723 A1 | 5/2007 | Mathew et al. |
| 2007/0140354 A1* | 6/2007 | Sun ................. 375/240.24 |
| 2007/0153896 A1 | 7/2007 | Song et al. |
| 2007/0160126 A1 | 7/2007 | Van Der Meer et al. |
| 2007/0160153 A1 | 7/2007 | Sullivan |
| 2007/0171969 A1 | 7/2007 | Han et al. |
| 2007/0201551 A1 | 8/2007 | Wang et al. |
| 2007/0217500 A1 | 9/2007 | Gao et al. |
| 2007/0223579 A1 | 9/2007 | Bao |
| 2007/0223582 A1* | 9/2007 | Borer ................. 375/240.12 |
| 2007/0230575 A1 | 10/2007 | Han |
| 2007/0274396 A1 | 11/2007 | Zhang et al. |
| 2008/0008249 A1 | 1/2008 | Yan |
| 2008/0013630 A1 | 1/2008 | Li et al. |
| 2008/0024513 A1 | 1/2008 | Raveendran |
| 2008/0084930 A1 | 4/2008 | Sekiguchi et al. |
| 2008/0089417 A1 | 4/2008 | Bao et al. |
| 2008/0095235 A1 | 4/2008 | Hsiang |
| 2008/0123947 A1 | 5/2008 | Moriya et al. |
| 2008/0152000 A1 | 6/2008 | Kaushik |
| 2008/0165848 A1 | 7/2008 | Ye et al. |
| 2008/0267289 A1 | 10/2008 | Yu et al. |
| 2008/0304567 A1 | 12/2008 | Boyce et al. |
| 2009/0003718 A1 | 1/2009 | Liu et al. |
| 2009/0060034 A1 | 3/2009 | Park et al. |
| 2009/0060050 A1 | 3/2009 | Park et al. |
| 2009/0207912 A1 | 8/2009 | Holcomb et al. |
| 2009/0219994 A1 | 9/2009 | Tu et al. |
| 2009/0262798 A1 | 10/2009 | Chiu et al. |
| 2010/0142615 A1 | 6/2010 | Han |

FOREIGN PATENT DOCUMENTS

| | | |
|---|---|---|
| CN | 1722838 | 1/2006 |
| CN | 1728833 | 2/2006 |
| CN | 101040533 | 9/2007 |
| EP | 1 401 211 | 3/2004 |
| EP | 1 617 677 | 1/2006 |
| JP | 4-207684 | 7/1992 |
| JP | 2000-506687 | 5/2000 |
| JP | 2000-165661 | 6/2000 |
| JP | 2000-165866 | 6/2000 |
| JP | 2000-242774 | 9/2000 |
| JP | 2001-197527 | 7/2001 |
| JP | 2002-152498 | 5/2002 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-035029 | 2/2008 |
| KR | 20020081777 | 10/2002 |
| RU | 2191469 | 10/2002 |
| SU | 1506554 | 9/1989 |
| WO | WO 98/41029 | 9/1998 |
| WO | WO 99/09748 | 2/1999 |
| WO | WO 00/33581 | 6/2000 |
| WO | WO 00/74385 | 12/2000 |
| WO | WO 01/95633 | 12/2001 |
| WO | WO 02/01881 | 1/2002 |
| WO | WO 02/50772 | 6/2002 |
| WO | WO 02/054777 | 7/2002 |
| WO | WO 02/085026 | 10/2002 |
| WO | WO 02/096120 | 11/2002 |
| WO | WO 03/007619 | 1/2003 |
| WO | WO 03/061294 | 7/2003 |
| WO | WO 03/107683 | 12/2003 |
| WO | WO 2004/008771 | 1/2004 |
| WO | WO 2004/036919 | 4/2004 |
| WO | WO 2006/006777 | 1/2006 |
| WO | WO 2006/079997 | 8/2006 |
| WO | WO 2006/112620 | 10/2006 |
| WO | WO 2006/125713 A2 | 11/2006 |
| WO | WO 2007/008286 | 1/2007 |
| WO | WO 2007/009875 | 1/2007 |
| WO | WO 2007/018669 | 2/2007 |
| WO | WO 2007/042365 | 4/2007 |
| WO | WO 2007/114617 | 10/2007 |

(56) References Cited

FOREIGN PATENT DOCUMENTS

| WO | WO 2008/004816 | 1/2008 |
|---|---|---|
| WO | WO 2008/049446 | 5/2008 |

OTHER PUBLICATIONS

"DivX Multi Standard Video Encoder," 2 pp. (Downloaded from the World Wide Web on Jan. 24, 2006).

ISO/IEC, "ISO/IEC 11172-2: Information Technology—Coding of Moving Pictures and Associated Audio for Storage Media at up to About 1.5 Mbit/s," 122 pp. (Aug. 1993).

ISO/IEC 14496-10, Joint Video Team (JVT) of ISO/IEC MPEG & ITU-T VCEG, Joint Draft 6, Apr. 2006, 527 pgs.

ISO/IEC, "Information Technology—Coding of Audio-Visual Objects: Visual, ISO/IEC 14496-2, Committee Draft," 330 pp. (Mar. 1998).

ITU, Recommendation H.261, "Line Transmission of Non-Telephone Signals," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

ITU, "ITU-T Recommendation H.264: Advanced Video Coding for generic audiovisual services," 281 pp. (May 2003).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).

Keys, "Cubic Convolution Interpolation for Digital Image Processing," Computer Graphics, vol. ASSP-29, No. 6, pp. 1153-1160 (Dec. 1981).

Mitchell et al., "Reconstruction Filters in Computer Graphics," Computer Graphics, vol. 22, No. 4 pp. 221-228 (Aug. 1988).

Reader, "History of MPEG Video Compression—Ver. 4.0," 99 pp. (document marked Dec. 16, 2003).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Chen et al., "Frame Loss Error Concealment for SVC," J Zhejiang Univ. Science A, vol. 7(5): 677-683 (2006), 7 pages. http://www.zju.edu.cn/jzus/2006/A0605/A06050.pdf.

Han et al., "Robust and Efficient Scalable Video Coding with Leaky Prediction," Information Systems Laboratory, Stanford University, pp. II-41 through II-44; 5 pages. http://66.102.1.104/scholar?hl=en& lr=&q=cache:fp7Qa34oceJ:viola.usc.edu/paper/icip2002/pdfs/2433.pdf.

Ji et al., "Three-Dimensional Subband Scalable Video Coding Embedded with H.264/AVC/ Codec," Proc of SPIE, vol. 5960, pp. 201-209, 9 pages. http://research.microsoft.com/~fengwu/papers/base_vcip_05.PDF.

Kirenko et al., "Modification of 3d Wavelet Scalable Video Coding" Philips Research Laboratories, The Netherlands, 6 pages. http://wwww.ece.ucdavis.edu/PCS2004/pdf/ID40_PCS_paper_final.pdf.

Schwarz et al., "Overview of the Scalable H.264/Mpeg4-AVC Extension," Fraunhofer Institute for Telecommunications—Heinrich Hertz Institute, Image Processing Dept., 4 pages. http://iphome.hhi.de/marpe/download/icip06_svc.pdf.

Schwarz et al., "Overview of the Scalable Video Coding Extension of the H.264/AVC Standard," IEEE Transactions on Circuits and Systems for Video Technology (Sep. 2007) 18 pages. http://iphome.hhi.de/marpe/download/ieee-7_svc_overview.pdf.

Wang et al., "WZS: Wyner-Ziv Scalable Predictive Video Coding," Integrated Media Systems Center and Department of Electrical Engineering, University of Southern California, 6 pages. http://www.ece.ucdavis.edu/PCS2004/pdf/ID110_pcs04/pdf.

Abhayaratne, "2D Wavelet Transforms with a Spatially Adaptive 2D Low Pass Filter," Signal Processing Symp., pp. 93-96 (Jun. 2004).

Abhayaratne, "Spatially Adaptive Integer Lifting with No Side Information for Lossless Video Coding," Picture Coding Symp., 6 pp. (Apr. 2003).

Andreopoulos et al., "A New Method for Complete-to-Overcomplete Discrete Wavelet Transforms," Proc. IEEE Conf. Digital Signal Proc., 4 pp. (Jul. 2002).

Andreopoulos et al., "Complete-to-Overcomplete Discrete Wavelet Transforms for Scalable Video Coding with MCTF," Proc. SPIE Visual Communications and Image Processing, pp. 719-731 (Jul. 2003).

Andreopoulos et al., "Fully-Scalable Wavelet Video Coding Using In-Band Motion Compensated Temporal Filtering," IEEE International Conference on Acoustics, Speech, and Signal Processing. IEEE, 4 pp. (Apr. 2003).

Andreopoulos et al., "Wavelet-Based Fully-Scalable Video Coding With In-Band Prediction," Proc. 3rd IEEE Benelux Signal Processing Symposium (SPS-2002), pp. S02 1 to S02-4 (Mar. 2002).

Anonymous, "Video Subgroup Schedule, 68th MPEG Meeting," 6 pp. (Mar. 2004).

Bjontegaard et al., "H.263 Anchors—Technical Description," MPEG95/0322 (1995).

Brainard et al., "Composite Television Coding: Subsampling and Interpolation," SMPTE Journal, pp. 717-724 (Aug. 1982).

Chang et al., "A Scalable Video Compression Technique Based on Wavelet Transform and MPEG Coding" IEEE Trans. on Consumer Electronics, vol. 45, No. 3, pp. 788-793 (Aug. 1999).

Chen et al., "Adaptive Joint Source-Channel Coding using Rate Shaping," ICASSP, 4 pp. (May 2002).

Chen et al., "Bidirectional MC-EZBC with Lifting Implementation," 26 pp. (document marked May 2003).

Chen et al., "Improved MC-EZBC with Quarter-pixel Motion Vectors," ISO/IEC JTC1/SC29/WG11, MPEG2002/m8366, Fairfax (2002).

Chen et al., "Improvements to the MC-EZBC Scalable Video Coder," ICIP 2003, vol. 2, pp. 14-17 (Sep. 2003).

Choi et al., "Motion-compensated 3-D subband coding of video," IEEE Trans. on Image Processing, vol. 8, No. 2, pp. 155-167 (Feb. 1999).

Chooi et al., "3D Subband Coder for Very Low Bit Rates" IEEE, pp. 405-408 (Apr. 1994).

Dufaux et al., "Abstract: Motion-compensated generic coding of video based on a multi resolution data structure," 2 pp. (1993) [downloaded from the World Wide Web on Jan. 25, 2006].

Einarsson et al., "Mixed Resolution Video Coding for Low Bit-Rate Channels," Proc. Int'l Workshop on Coding Techniques for Very Low Bit-Rate Video: VLBV97, Linköping, Sweden, pp. 77-80 (Jul. 1997).

Gharavi et al., "Video Coding and Distribution over ATM for Multipoint Teleconferencing," GLOBECOM '93, 7 pp. (1993).

ISO/IEC JTC1/SC29/WG11 MPEG2003/N6193, "Call for Proposals on Scalable Video Coding Technology," 12 pp. (Dec. 2003).

ISO/IEC JTC1/SC29/WG11 MPEG2004/W6383, "Subjective test results for the CfP on Scalable Video Coding Technology," 17 pp. (Mar. 2004).

ISO/IEC JTC1/SC29/WG11 MPEG2004/M11126, "Spatial Scalability in 3D Wavelet Coding with Spatial Domain MCTF Encoder," 14 pp. (Jul. 2004).

Iwahashi et al., "A Motion Compensation Technique for Downscaled Pictures in Layered Coding," IEICE Transactions on Comm., vol. E77-B, No. 8, pp. 1007-1012 (Aug. 1994).

(56) References Cited

OTHER PUBLICATIONS

Ji et al., "Architectures of Incorporating MPEG-4 AVC into Three-Dimensional Wavelet Video Coding," *Picture Coding Symposium 2004*, 6 pp. (Dec. 2004).

Joint Video Team (JVT) of ISO/IEC MPEG & ITU-T VCEG, "Joint Final Committee Draft (JFCD) of Joint Video Specification," JVT-D157, 207 pp. (Aug. 2002).

Karlsson et al., "Subband Coding of Video for Packet Networks" *Optical Engineering*, vol. 27, No. 7, pp. 574-586 (Jul. 1988).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Li et al., "All-phase Motion Compensated Prediction for High Performance Video Coding," Proc. ICIP, vol. 3, pp. 538-541 (2001).

Luo et al., "Advanced Lifting-based Motion Threading (MTh) Technique for the 3D Wavelet Video Coding," *Proceedings of the SPIE/IEEE Visual Communications and Image Processing (VCIP2003)*, vol. 5150, pp. 707-718 (Jun. 2003).

Luo et al., "Motion Compensated Lifting Wavelet and Its Application in Video Coding," *Proceedings of the IEEE Int. Conf. on Multimedia and Expo*, 4 pp. (Aug. 2001).

Mehrseresht et al., "Adaptively Weighted Update Steps in Motion Compensated Lifting Based on Scalable Video Compression," *Proceedings of the IEEE Int. Conf. on Image Processing*, vol. 2, 4 pp. (Sep. 2003).

Netravali et al., "Adaptive Quantization of Picture Signals Using Spatial Masking," *Proc. IEEE*, vol. 65, pp. 536-548 (1977).

Niu et al., "MPEG-4 Video Encoder Based on DSP-FPGA Techniques," *IEEE Int'l Conf. on Communications, Circuits and Systems*, vol. 1, pp. 518-522 (May 2005).

Ohm, "Three Dimensional Subband Coding with Motion Compensation," *IEEE Trans. on Image Processing*, vol. 3, No. 5, pp. 559-571 (Sep. 1994).

Pesquet-Popescu et al., "Three-dimensional Lifting Schemes for Motion Compensated Video Compression," *ICASSP*, vol. 3, 4 pp. (2001).

Piella et al., "An Adaptive Update Lifting Scheme with Perfect Reconstruction," *IEEE Int'l Conf. on Image Processing*, vol. 3, pp. 190-193 (Oct. 2001).

Printouts of FTP directories from http://ftp3.itu.ch, 8 pp. (downloaded from the World Wide Web on Sep. 20, 2005).

Santa Cruz, "JVT-0061-CE9verif.doc," 2 pp. (downloaded from the World Wide Web on May 10, 2005.).

Sebe et al., "An Overcomplete Discrete Wavelet Transform for Video Compression," *IEEE Int'l Conf. on Multimedia and Expo*, 4 pp. (Nov. 2002).

Secker et al., "Highly Scalable Video Compression Using a Lifting-based 3D Wavelet Transform with Deformable Mesh Motion Compensation," *IEEE Int'l Conf. on Image Processing*, vol. 3, 4 pp. (Jun. 2002).

Secker et al., "Lifting-based Invertible Motion Adaptive Transform (LIMAT) Framework for Highly Scalable Video Compression," *IEEE Trans. Image Processing*, vol. 12, 35 pp. (Dec. 2003).

Song et al., "Content Adaptive Update Steps for Lifting-Based Motion Compensated Temporal Filtering," *Picture Coding Symposium*, 5 pp. (Dec. 2004).

Sullivan, "Color Format Upconversion for Video Display," JVT-I019r2, San Diego, 6 pp. (Sep. 2003).

Sullivan, "Resampling Filters for SVC Upsampling," JVT-R066, Bangkok, Thailand, 9 pp. (Jan. 2006).

Sun, "Resampling Process for Interlaced Materials in SVC," JVT-Rxxx, Meeting: Bangkok, Thailand, 9 pp. (Jan. 2006).

Sun et al., "Seamless Switching of Scalable Video Bitstreams for Efficient Streaming," *IEEE Transactions on Multimedia*, vol. 6, No. 2, pp. 291-303 (Apr. 2004).

Tomasi et al., "Bilateral Filtering for Gray and Color Images," *IEEE Int'l Conf. on Computer Vision*, 8 pp. (Jan. 1998).

Turaga et al., "Content-adaptive filtering in the UMCTF framework," *IEEE Proc. Int'l Conf. on Acoustics, Speech and Signal Processing*, vol. 3, pp. 621-624 (Apr. 2003).

Video Compression 1: H 261—Multimedia Systems (Module 4 Lesson 2), 5 pp. (document not dated).

Voloshynovskiy et al., "A Stochastic Approach to Content Adaptive Digital Image Watermarking," 26 pp. (Sep. 1999).

Wang et al., "Adaptive Image Matching in the Subband Domain," *Proc. SPIE*, 12 pp. (Dec. 2004).

Wien, "Variable Block-Size Transforms for Hybrid Video Coding," Dissertation, 182 pp. (Feb. 2004).

Wu et al., "Bit-depth scalability compatible to H.264/AVC-scalable extension," *J. Vis. Commun. Image R.*, vol. 19, pp. 372-381 (Jun. 2008).

Wu et al., "SMART: An Efficient, Scalable and Robust Streaming Video System," *EURASIP on Applied Signal Processing*, vol. 2, 39 pp. (Feb. 2004).

Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).

Xiong et al., "Spatial Scalability in 3D Wavelet Coding with Spatial Domain MCTF Encoder," *Picture Coding Symposium*, 6 pp. (Dec. 2004).

Xu et al., "3D Sub-band Video Coding Using Barbell Lifting," MPEG2004/M10569/S05, 14 pp. (downloaded from the World Wide Web on May 10, 2005.).

Xu et al., "Three-Dimensional Embedded Subband Coding with Optimal Truncation (3D ESCOT," *Applied and Computational Harmonic Analysis*, pp. 290-315 (May 2001).

Yang et al., "A Novel Adaptive De-Interlacing Algorithm Based on Motion Compensation," *Microelectronics and Computer*, Issue 9, pp. 4-6 (Sep. 30, 2002).

Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).

Zhao et al., "Macroblock Skip-Mode Prediction for Complexity Control of Video Encoders," *IEEE Int'l Conf. on Visual Information Engineering*, 4 pp. (Jul. 2003).

U.S. Appl. No. 11/127,001.
U.S. Appl. No. 11/126,997.
U.S. Appl. No. 11/126,650.
U.S. Appl. No. 11/650,531.
U.S. Appl. No. 12/074,030.
U.S. Appl. No. 12/077,768.
U.S. Appl. No. 12/205,689.
U.S. Appl. No. 12/197,922.
U.S. Appl. No. 13/102,943.

Bottreau et al., "A Fully Scalable 3D Subband Video Codec," Proc. Int'l Conf. on Image Processing, vol. 2, pp. 1017-1020 (Oct. 2001).

Kim et al., "Low Bit-Rate Scalable Video Coding with 3-D Set Partitioning in Hierarchical Trees (3-D SPIHT)," IEEE Trans.on Circuits and Systems for Video Technology, vol. 10, No. 8, pp. 1374-1387 (Dec. 2000).

\* cited by examiner software 180 implementing encoding and/or decoding with
motion-compensated prediction of inter-layer residuals

MOTION-COMPENSATED PREDICTION OF INTER-LAYER RESIDUALS

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Most scalable video codecs split video into a base layer and an enhancement layer. The base layer alone provides a reconstruction of the video at a lower resolution, and the enhancement layer can be added to provide extra information that will increase the video quality. In many prior art systems, an enhancement layer codec depends on the base layer to provide a certain amount of information necessary to encode or decode the enhancement layer. For example, the enhancement layer coding is based upon base layer coding information such as motion vectors and DCT coefficients used to encode the base layer frame. As a result, the enhancement layer codec is coupled with the given base layer codec so the enhancement layer codec can use the same macroblocks and motion vectors as the base layer codec. Thus, a base layer encoded according to one standard would require a different enhancement layer codec than a base layer encoded according to another standard. This multiplicity of enhancement layer codecs can lead to a very high cost of developing, testing, and deploying the enhancement layer codecs.

Various methods are known for encoding enhancement layer video. However, when performing these encoding methods, the enhancement layer encoder generally relies upon the motion vectors, DCT coefficients, or other information output from the base layer. While these methods of encoding enhancement layer video provide acceptable performance in many scenarios, they do not have the benefits and advantages of the techniques and tools described below.

SUMMARY

In summary, the detailed description presents techniques and tools for encoding and decoding base layer video and inter-layer residual video. For example, the techniques and tools improve the performance of a general-purpose video encoder by separating the inter-layer residual encoding from the base layer encoding, thereby improving quality and/or reducing development time and cost for introducing new codecs. The techniques and tools additionally allow motion compensation to be performed on the inter-layer residual video relative to previously reconstructed inter-layer residual video, which can further improve quality.

In one embodiment of the present disclosure, a tool such as an encoding tool encodes base layer video to produce at least part of a base layer bit stream. The tool encodes inter-layer residual video to produce at least part of an enhancement layer bit stream. The inter-layer residual video represents differences between the base layer video and input video. Encoding the inter-layer residual video includes sample-domain prediction (e.g., motion compensation) of the inter-layer residual video relative to previously reconstructed inter-layer residual video. The tool signals at least part of the base layer bit stream and at least part of the enhancement layer bit stream.

In another embodiment of the present disclosure, a tool such as a decoding tool decodes at least part of a base layer bit stream to reconstruct base layer video. The tool also decodes part of an enhancement layer bit stream to reconstruct inter-layer residual video that represents differences between the base layer video and input video from encoding. The tool then combines the reconstructed base layer video and the reconstructed inter-layer residual video to reconstruct a higher quality reconstruction of the input video as output video.

In certain implementations, a buffer stores previously reconstructed inter-layer residual video. A motion compensation module predicts the inter-layer residual video relative to the previously reconstructed inter-layer residual video.

In certain implementations, a scaler maps samples of the inter-layer residual video from one sample depth to a lower sample depth before encoding. This can facilitate encoding of the inter-layer residual video with an off-the-shelf encoder than accepts video at the lower sample depth. After decoding, an inverse scaler maps samples of the inter-layer residual video from the lower sample depth to the original, higher sample depth before the reconstructed base layer video and the reconstructed inter-layer residual video are combined.

The foregoing and other objects, features, and advantages of the invention will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

The present application relates to techniques and tools for efficiently encoding and decoding enhancement layer video and base layer video. Generally, the techniques and tools facilitate implementation by separating the enhancement layer codec from the base layer codec. In some implementations, the enhancement layer video is encoded as a motion-compensated inter-layer residual using motion compensation relative to previously reconstructed inter-layer residual video. For example, a first encoder encodes the base layer video according to the VC-1 standard, H.264 standard, MPEG-2 standard or another encoding approach. Inter-layer residual video represents differences between the base layer video and higher quality input video. The input video can itself be reformatted or otherwise pre-processed before the inter-layer residual video is determined from the base layer video and input video. A second encoder, with its own motion compensation loop, encodes the inter-layer residual video according to the VC-1 standard, H.264 standard, MPEG-2 standard or another encoding approach, using motion compensation to predict blocks or macroblocks of the inter-layer residual video relative to previously reconstructed inter-layer residual video. In corresponding decoding, a first decoder decodes the base layer video, and a second decoder (with its own motion compensation loop) decodes the inter-layer residual video using motion compensation relative to previously reconstructed inter-layer residual video. Combining the reconstructed base layer video and reconstructed inter-layer residual video yields a reconstruction of the higher quality input video as output video. The output video can then be reformatted or otherwise subjected to post-processing before display.

Various alternatives to the implementations described herein are possible. Certain techniques described with reference to flowchart diagrams can be altered by changing the ordering of stages shown in the flowcharts, by splitting, repeating or omitting certain stages, etc. The various techniques and tools described herein can be used in combination or independently. Different embodiments implement one or more of the described techniques and tools.

Some of the techniques and tools described herein address one or more of the problems noted in the background. Typically, a given technique/tool does not solve all such problems. Rather, in view of constraints and tradeoffs in encoding time, encoding resources, decoding time, decoding resources, available bit rate, and/or quality, the given technique/tool improves performance for a particular implementation or scenario.

I. Computing Environment

Figure 1:
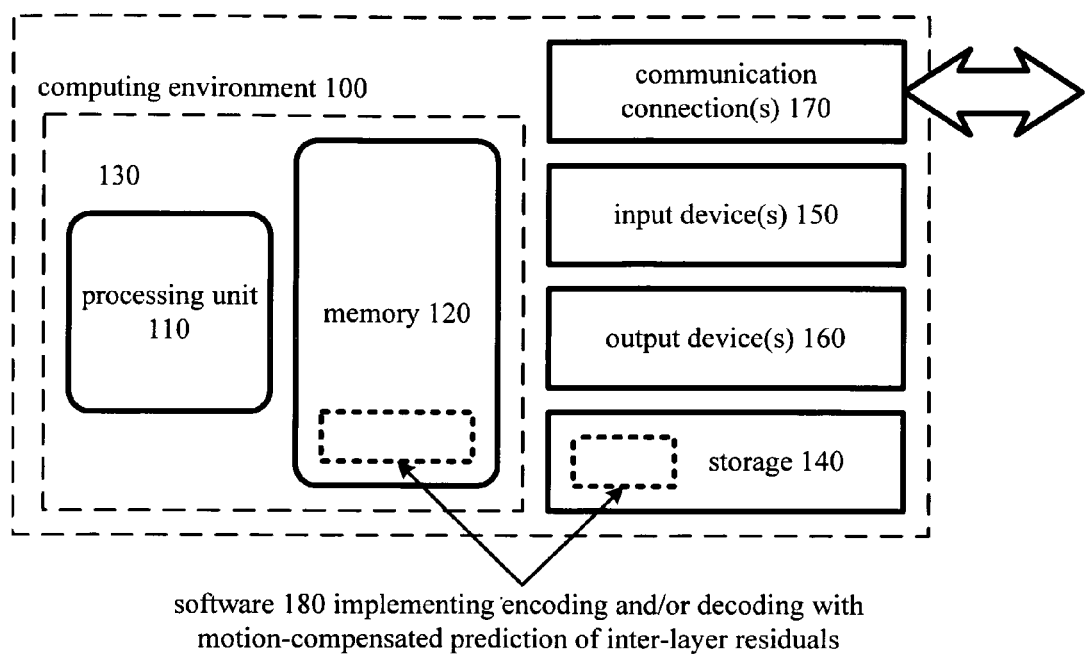
FIG. 1 is a block diagram of a suitable computing environment in which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder with one or more of the described techniques and tools for encoding and/or decoding with motion-compensated prediction of inter-layer residuals.

A computing environment may have additional features. For example, the computing environment (100) includes storage (140), one or more input devices (150), one or more output devices (160), and one or more communication connections (170). An interconnection mechanism not shown such as a bus, controller, or network interconnects the components of the computing environment (100). Typically, operating system software not shown provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "reconstruct" to describe computer operations in a computing environment. These terms are high-level abstractions for operations performed by a computer, and should not be confused with acts performed by a human being. The actual computer operations corresponding to these terms vary depending on implementation.

II. Theory and Explanation

One approach to encoding an enhancement layer video frame $E_t$ at time t, is to predict $E_t$ from a previously reconstructed enhancement layer video frame $E_{t-1}$ at earlier time t-1 using motion information. For example, an encoder uses a motion vector MV for each of multiple blocks or macroblocks in the enhancement layer video frame $E_t$. The encoder compares the actual enhancement layer video frame $E_t$ with the motion-compensation-predicted enhancement layer video frame $E_{t-1}^{MV}$ to determine a prediction error $c_t$. The encoder then encodes the prediction error $c_t$, where $c_t = E_t - E_{t-1}^{MV}$.

Another approach to encoding an enhancement layer frame $E_t$ at time t is to compare the enhancement layer video frame $E_t$ at time t with its corresponding base layer frame $B_t$ at time t, so as to compute the inter-layer residual $d_t$. For example, an encoder compares a block in the enhancement layer video frame $E_t$ with the collocated block in the base layer frame $B_t$, computing $d_t = E_t - B_t$.

In a third approach to encoding an enhancement layer video frame $E_t$ at time t, the motion-compensated prediction residual $(B_t - B_{t-1}^{MV})$ of the base layer is used to predict the motion-compensated prediction residual $(E_t - E_{t-1}^{MV})$ of the enhancement layer video frame $E_t$. The resulting difference $e_t$ indicates differences between the motion-compensated prediction residual $(E_t - E_{t-1}^{MV})$ of the enhancement layer video frame $E_t$ and the motion-compensated prediction residual $(B_t - B_{t-1}^{MV})$ of the base layer: $e_t = (E_t - E_{t-1}^{MV}) - (B_t - B_{t-1}^{MV})$. Such prediction of motion-compensation residuals can be implemented using a single-loop architecture or a multi-loop architecture.

In an example single loop implementation, the base layer motion-compensated prediction residual $(B_t - B_{t-1}^{MV})$ is available for prediction for the enhancement layer video, even if the reconstructed base layer frame $B_t$ is not available for inter-coded content. An encoder predicts the enhancement layer video motion-compensated prediction residual $(E_t - E_{t-1}^{MV})$ for the frame $E_t$ using the base layer motion-compensated prediction residual $(B_t - B_{t-1}^{MV})$, then encodes the differences $e_t = (E_t - E_{t-1}^{MV}) - (B_t - B_{t-1}^{MV})$. This can make encoding of the enhancement layer video motion-compensated prediction residual more efficient in terms of rate-distortion performance ($e_t$ vs. just $(E_t - E_{t-1}^{MV})$). To reconstruct the enhancement layer video frame $E_t$, the decoder uses a single decoding loop with motion compensation of blocks of $E_t$ relative to buffered, reconstructed enhancement layer video frames such as $E_{t-1}$. The decoder uses the base layer motion-compensated prediction residual $(B_1 - B_{t-1}^{MV})$ to predict the enhancement layer video motion-compensated prediction residual $(E_t - E_{t-1}^{MV})$, adding $e_t$ to $(B_t - B_{t-1}^{MV})$ to get a reconstructed version of $(E_t - E_{t-1}^{MV})$. The decoder then adds the reconstructed $(E_t - E_{t-1}^{MV})$ to $E_{t-1}^{MV}$ to get a reconstructed version of the enhancement layer video frame $E_t$. Or, to reconstruct the base layer video instead of enhancement layer video, the decoder uses a single decoding loop for base layer decoding.

The example single loop implementation is computationally efficient in some scenarios, since it includes a single motion-compensation loop used for either base layer decoding or enhancement layer video decoding. It has several drawbacks, however. First, to perform simple inter-layer prediction $(d_t = E_t - B_t)$ while using only a single motion compensation loop, the base layer video is intra-coded and decoded since inter-coding/decoding would require another motion compensation loop. The performance benefits of inter-coding/decoding the base layer video are lost.

Second, in the example single-loop implementation, if the base layer video and enhancement layer video use different motion vectors, prediction of motion compensation residuals becomes much less effective. For this reason, enhancement layer motion vectors are typically constrained to be the same as base layer motion vectors when predicting motion compensation residuals between layers in single loop approaches. This can still be inefficient in terms of rate-distortion performance, however. Often, base layer motion vectors are selected to improve base layer performance, and decreasing base layer quality so as to improve enhancement layer video coding efficiency is not acceptable. Even if motion vectors are selected so as to collectively improve rate-distortion performance for the base layer video and enhancement layer video (e.g., to minimize bits used for the motion vectors, $(B_t - B_{t-1}^{MV})$ and $(E_t - E_{t-1}^{MV})$), the motion vectors may be non-optimal in terms of $e_t$.

Third, in the example single-loop implementation, if the base layer video and enhancement layer video have different spatial resolutions, prediction of motion compensation residuals becomes much less effective. The base layer motion-compensated prediction residual $(B_t - B_{t-1}^{MV})$ are upsampled to have the same resolution as the enhancement layer video motion-compensated prediction residual $(E_t - E_{t-1}^{MV})$. Since neighboring blocks of base layer video may have different motion vectors (even if the same motion vectors are used for base layer video and enhancement layer video), there may be limitations on upsampling across block boundaries between the neighboring blocks. Block boundary artifacts and artificial high-frequency noise can be introduced in the upsampled $(B_t - B_{t-1}^{MV})$, which hurts the efficiency of the prediction of $e_t$. Although these problems arise in cases of 1:2 upsampling, they are exacerbated for non-dyadic cases (such as 2:3 upsampling) since a base layer block corresponds to a non-integer number of enhancement layer video frame blocks, and thus different parts of a given enhancement layer video block may have content reconstructed using different motion vectors, with separate upsampling of different portions.

The present application relates to techniques and tools for encoding and decoding inter-layer residual video using motion compensation. Example embodiments use multiple motion compensation loops in encoding and decoding, one loop for encoding (or decoding) base layer video and the other loop for encoding (or decoding) inter-layer residual video. Noting that $E_t = B_t + d_t$, prediction of motion compensation residuals between base layer video (corresponding to the frame $B_t$ at time t) and the original input video (corresponding to the frame $E_t$ at time t) can be represented as follows.

$$e_t = (E_t - E_{t-1}^{MV}) - (B_t - B_{t-1}^{MV}) = ((B_t + d_t) - (B_{t-1}^{MV} + d_{t-1}^{MV})) - (B_t - B_{t-1}^{MV}) = d_t - d_{t-1}^{MV}.$$

In other words, the inter-layer residual video $d_t$ at time t can be predicted using motion compensation relative to the previously reconstructed inter-layer residual video $d_{t-1}$ at time t-1. The difference signal $e_t$ represents differences between the inter-layer residual video $d_t = E_t - B_t$ and motion-compensation-predicted inter-layer residual video $d_{t-1}^{MV}$. The inter-layer prediction residual $e_t$ is entropy coded and signaled, along with motion vectors for the inter-layer residual video $d_t$. Thus, encoding and decoding is simplified by removing dependencies between base layer encoding/decoding and enhancement layer encoding/decoding. Coding efficiency can also be increased since motion vectors for the different layers can be selected to improve performance for the respective layers.

III. Motion-Compensated Prediction of Inter-Layer Residual Video in Encoding

This section describes example embodiments that use multiple motion compensation loops in encoding, one loop for encoding base layer video and the other loop for encoding inter-layer residual video.

A. Encoding Tools.

Figure 2:
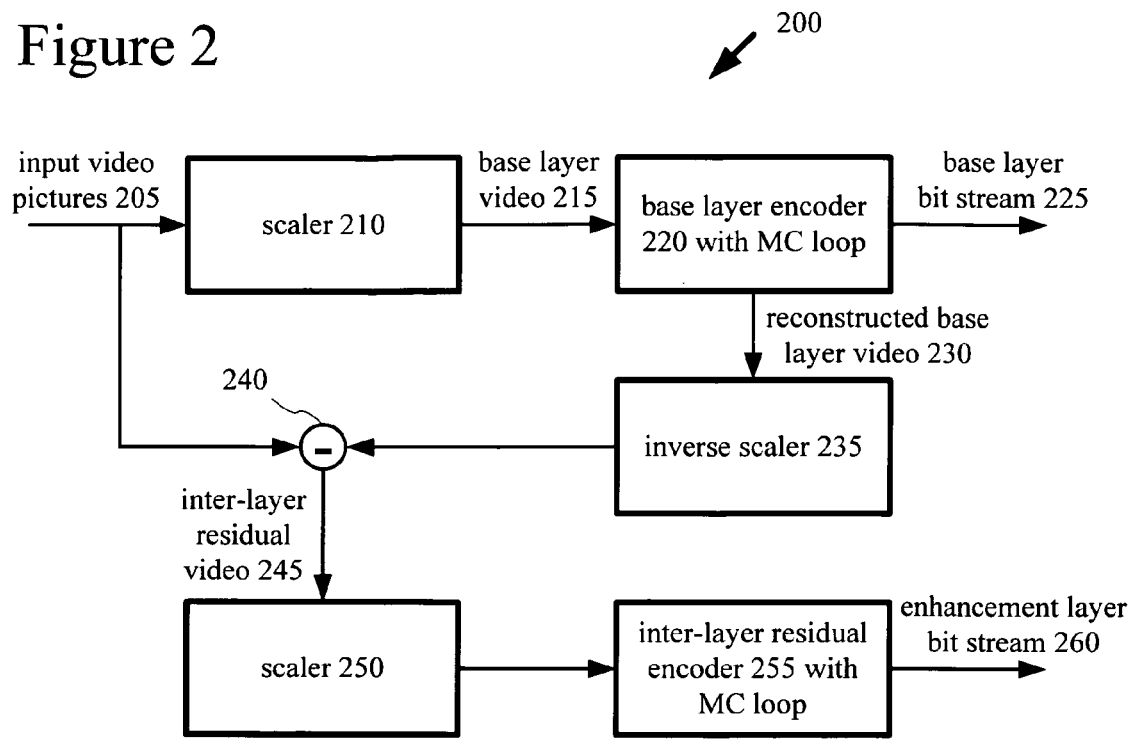
FIG. 2 is a block diagram of a generalized video encoding system for multi-loop, scalable encoding of base layer video and motion-compensated inter-layer residual video.

FIG. 2 shows a block diagram of a generalized tool (200) in conjunction with which some described embodiments may be implemented. The tool (200) receives a sequence of video pictures including input video pictures (205) and produces a base layer bit stream (225) and an enhancement layer bit stream (260). For the base layer, the format of the base layer bit stream (225) can be a Windows Media Video or VC-1 format, MPEG-x format (e.g., MPEG-1, MPEG-2, or MPEG-4), H.26x format (e.g., H.261, H.262, H.263, or H.264), or other format. The format of the enhancement layer bit stream (260) can be the same as the base layer bit stream or one of the other listed formats (after appropriate mapping to an acceptable input format, if needed).

The tool (200) processes video pictures. The term picture generally refers to source, coded, or reconstructed image data. For progressive video, a picture is a progressive video frame. For interlaced video, a picture may refer to an interlaced video frame, the top field of the frame, or the bottom field of the frame, depending on context.

Input video pictures (205) are input to a first scaler (210). In certain instances, the input video pictures (205) may have 10-bit samples or 12-bit samples, and the tool (200) uses a base layer encoder (220) that accepts video pictures with 8-bit samples. In such instances, the first scaler (210) will downsample the 10-bit (or 12-bit) input video pictures (205) into base layer video (215) with 8-bit samples. For sample depth downsampling, the first scaler (210) may clip the least significant x bits of a sample, use tone mapping to map sample values in one bit depth (e.g., 10 bits per sample) to another bit depth (e.g., 8 bits per sample), or use another downsampling method. The first scaler (210) may also be operable to change other aspects of the input pictures (205) such as the spatial resolution or chroma sampling rate. For example, if the input pictures (205) are in CIF resolution, then the base layer video (215) could be QCIF. In other instances (e.g., for SNR scalability), the input video pictures (205) already have the desired bit depth, and the first scaler (210) will simply output the base layer video (215) without alteration. In alternative instances, the input video pictures (205) may have a bit depth that is lower than desired. For example, the input video pictures (205) may have 8-bit samples and the tool (200) uses a base layer encoder (220) that accepts video pictures with 12-bit samples. In this instance, the scaler (210) would upsample the 8-bit input video pictures (205) into base layer video (215) with 12-bit samples. Similarly, the scaler (210) may be operable to upsample other aspects of the input pictures (205) such as the spatial resolution or chroma sampling rate so as to produce base layer video (215) ready for encoding with the base layer encoder (220).

The base layer video (215) that is output from the first scaler (210) is input to a base layer encoder (220) having a motion compensation loop. A motion compensation loop includes one or more modules for performing motion compensation as well as a buffer for storing reconstructed video pictures. For a block or macroblock in a current video picture, the motion compensation module(s) use motion information (such as a motion vector) to derive a prediction from a buffered, reconstructed video picture. The sample-by-sample differences (if any) between the block or macroblock and the prediction are represented as a motion-compensation residual, which is also encoded. As part of the loop, the current video picture is reconstructed and buffered for use in motion compensation of another video picture, which can be earlier or later in display order. In an encoder, one or more motion estimation modules also determine the motion information for the blocks or macroblocks of the current video picture (e.g., finding motion vectors). The base layer encoder (220) encodes and outputs a base layer bit stream (225). The base layer bit stream (225) may be in VC-1, MPEG-x, H.26x, or some other video format.

As part of encoding, the base layer encoder (220) also reconstructs the base layer video (215) and makes available reconstructed base layer video (230). If the input video pictures (205) were previously downsampled or otherwise scaled by the first scaler (210), then the reconstructed version (230) is upsampled or otherwise inverse scaled by an inverse scaler (235) so that the reconstructed version (230) has the sample bit depth, spatial resolution, chroma sampling rate, etc. as the input video pictures (205). Alternatively, in addition to being output from the tool (200), the encoded base layer bit stream (225) is also input to a separate decoder (not shown) to create the reconstructed version (230) of the input picture (205).

The reconstructed base layer video (230) is compared against the input video pictures (205) at a differentiator (240). The differentiator (240) subtracts samples of the reconstructed version (230) of the base layer video from corresponding samples of the input video pictures (205) to produce an inter-layer residual video (245). One or both of the inputs to the differentiator (240) may be additionally filtered before the inter-layer residual video (245) is computed. Additionally, the residual video (245) may be input to a second scaler (250) operable to downsample, upsample, or otherwise scale the residual video. In some embodiments, the first scaler (210) may be the same physical component or software program as the second scaler (250), and be accessed multiple times during the encoding process. For example, the second scaler (250) maps samples of the inter-layer residual video (245) from a first bit depth (e.g., 10 bits per sample, 12 bits per samples) to a second bit depth (e.g., 8 bits per sample) lower than the first. In some cases, this facilitates encoding with an off-the-shelf encoder that accepts video in the second bit depth. When the second bit depth is sufficient to represent the variations in sample values in the inter-layer residual video (245), such scaling does not even impose a penalty to quality. Moreover, memory requirements can be reduced for encoding and decoding, for example, since reconstructed video pictures with the lower sample depth are buffered for use in motion compensation. Alternatively, the second scaler (250) maps samples of the inter-layer residual video (245) from a first bit depth (e.g., 8 bits per sample) to a second bit depth (e.g., 16 bits per sample) higher than the first, so as to facilitate encoding that uses high-fidelity reference pictures for the inter-layer residual video, and thereby improve motion compensation and overall encoding efficiency.

The inter-layer residual video (245) is then encoded by an inter-layer residual encoder (255) with a motion compensation loop. The inter-layer residual encoder (255) outputs an enhancement layer bit stream (260). For example, the inter-layer residual encoder (255) can be a VC-1 encoder, MPEG-2 encoder, or H.264 encoder.

In some implementations, the inter-layer residual video (245) is itself decomposed or otherwise separated into multiple layers of video, which can be encoded with separate residual encoders. For example, if the first scaler (210) scales the sample depth and chroma sampling rate of the input video when producing base layer video, the inter-layer residual video can be split into a layer of sample depth residual video and a layer of chroma sampling rate residual video, which are encoded with separate encoders. More generally, the inter-layer residual video that is encoded represents differences between the base layer video and higher quality input video, but does not necessarily represent all such differences.

To produce these various bitstreams, in some cases, the system (200) alters the bit depth of the input video picture (205) such that the system (200) can use an existing encoder to encode one or more of the layers and output the bitstreams. In some implementations, the system (200) uses the same encoder for the base layer video and inter-layer residual video. In other implementations, the base layer encoder (220) and inter-layer residual encoder (255) are different.

B. Exemplary Encoding Tool.

Figure 3:
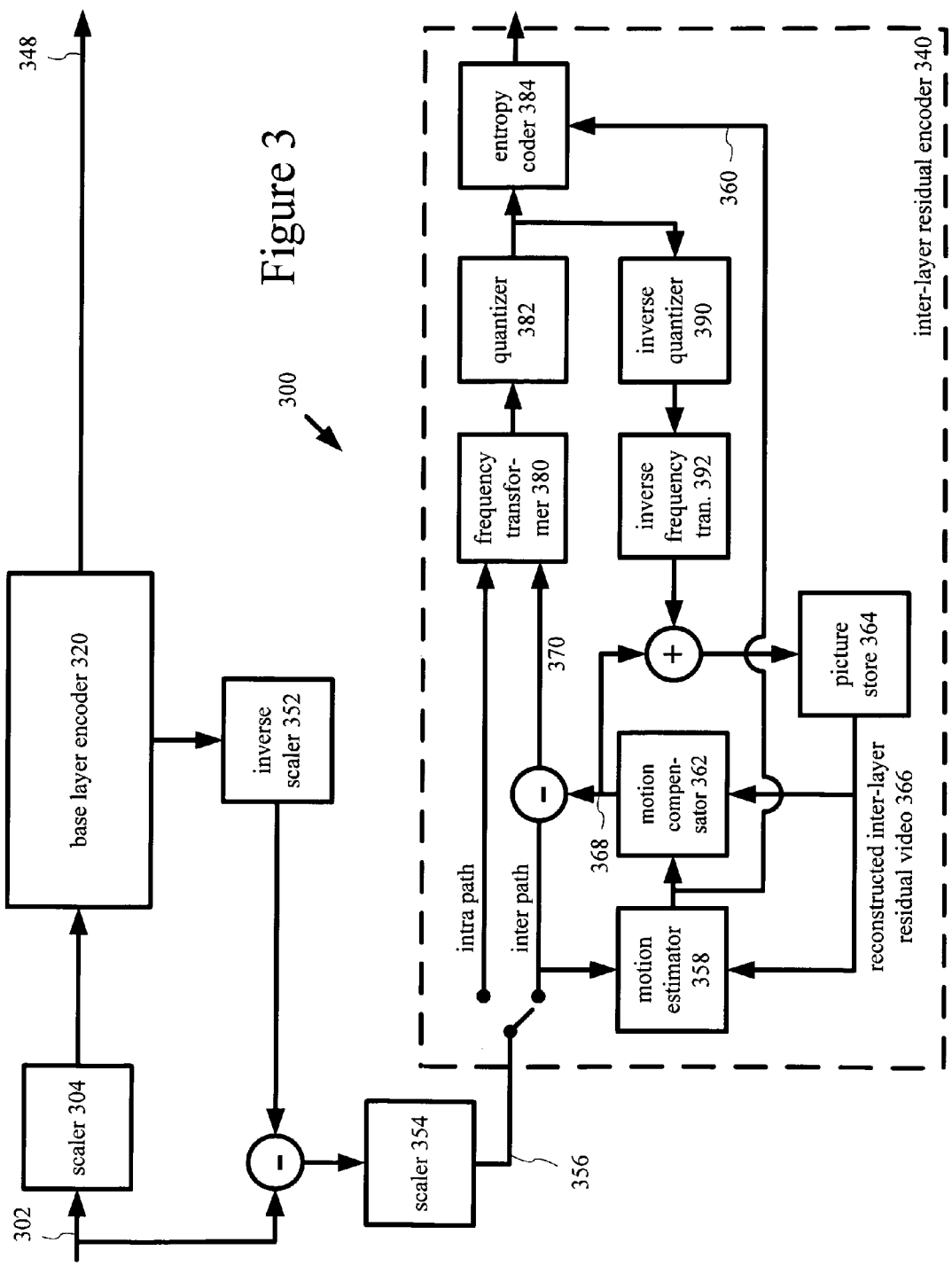
FIG. 3 is a block diagram of an exemplary video encoding system for multi-loop, scalable encoding of base layer video and motion-compensated inter-layer residual video, showing modules of an inter-layer residual encoder.

FIG. 3 is a block diagram of an encoding tool (300) including an exemplary video encoder in conjunction with which some described embodiments may be implemented.

The encoding tool includes a first scaler (304) which accepts input video pictures (302) and outputs base layer video to a base layer encoder (320). The first scaler (304) may downsample or otherwise scale the input video pictures (302), for example, to reduce sample depth, spatial resolution or chroma sampling resolution. Or, in some instances, the first scaler upsamples the input video pictures (302) or does not alter the input video pictures (302) at all.

The base layer encoder (320) encodes the base layer video and outputs a base layer bit stream (348), and additionally makes available reconstructed base layer video which is input to an inverse scaler (352). If the reconstructed base layer video has a different bit depth, spatial resolution, chroma sampling rate, etc. than the input video frames (302) due to scaling, then the inverse scaler (352) may upsample (or otherwise inverse scale) the reconstructed base layer video so that it has the same resolution as the input video frames (302). The input video frames (302) are compared against the reconstructed base layer video to produce inter-layer residual video that is input to a second scaler (354). The second scaler (354) may or may not be the same physical component or software program as the first scaler (304). The second scaler (354) outputs the inter-layer residual video (356) to an inter-layer residual encoder (340).

The inter-layer residual encoder (340) compresses inter-coded, predicted "pictures" (356) of the inter-layer residual video and intra-coded "pictures" (356) of the inter-layer residual video. The "picture" at a given time in the inter-layer residual video represents differences between an input video picture and a reconstructed base layer video picture, but is still encoded as a picture by the example encoder (340). For the sake of presentation, FIG. 3 shows a path for intra-coded content through the inter-layer residual encoder (340) and a path for inter-coded predicted content. Many of the components of the inter-layer residual encoder (340) are used for compressing both intra-coded content and inter-coded, pre-dicted content. The exact operations performed by those components can vary depending on the type of information being compressed. Although FIG. 3 shows a single inter-layer residual encoder (340), the inter-layer residual video (356) can itself be separated into multiple layers of residual video for encoding with separate residual encoders. Generally, the inter-layer residual video (356) that is encoded represents differences (but not necessarily all differences) between the reconstructed base layer video and the input video.

In general, inter-coded, predicted content (as a picture) is represented in terms of prediction from previously reconstructed content (as one or more other pictures. which are typically referred to as reference pictures or anchors). For example, content at a given time is encoded as a progressive P-frame or B-frame, interlaced P-field or B-field, or interlaced P-frame or B-frame. Within the encoder (340), a prediction residual is the difference between predicted information and corresponding original inter-layer residual video.

If the inter-layer residual video (356) content is encoded as a predicted picture, a motion estimator (358) estimates motion of macroblocks or other sets of samples of the inter-layer residual video picture with respect to one or more reference pictures, which represent previously reconstructed inter-layer residual video content. The picture store (364) buffers reconstructed inter-layer residual video (366) as a reference picture. When multiple reference pictures are used, the multiple reference pictures can be from different temporal directions or the same temporal direction. The motion estimator (358) outputs motion information (360) such as motion vector information.

The motion compensator (362) applies reconstructed motion vectors to the reconstructed inter-layer residual video content (366) (stored as reference picture(s)) when forming a motion-compensated current picture (368). The difference (if any) between a block of the motion-compensated inter-layer residual video (368) and corresponding block of the original inter-layer residual video (356) is the prediction residual (370) for the block. During later reconstruction of the inter-layer residual video, reconstructed prediction residuals are added to the motion compensated inter-layer residual video (368) to obtain reconstructed content closer to the original inter-layer residual video (356). In lossy compression, however, some information is still lost from the original inter-layer residual video (356). Alternatively, a motion estimator and motion compensator apply another type of motion estimation/compensation.

A frequency transformer (380) converts spatial domain video information into frequency domain (i.e., spectral, transform) data. For block-based video content, the frequency transformer (380) applies a DCT, variant of DCT, or other forward block transform to blocks of the samples or prediction residual data, producing blocks of frequency transform coefficients. Alternatively, the frequency transformer (380) applies another conventional frequency transform such as a Fourier transform or uses wavelet or sub-band analysis. The frequency transformer (380) may apply an 8×8, 8×4, 4×8, 4×4 or other size frequency transform.

A quantizer (382) then quantizes the blocks of transform coefficients. The quantizer (382) applies non-uniform, scalar quantization to the spectral data with a step size that varies on a picture-by-picture basis, macroblock-by-macroblock basis or other basis. The quantizer (382) can also apply another type of quantization, for example, a uniform or adaptive quantization for at least some spectral data coefficients, or directly quantizes spatial domain data in an encoder system that does not use frequency transformations.

When a reconstructed inter-layer residual video picture is needed for subsequent motion estimation/compensation, an inverse quantizer (390) performs inverse quantization on the quantized spectral data coefficients. An inverse frequency transformer (392) performs an inverse frequency transform, producing blocks of reconstructed prediction residuals (for predicted inter-layer residual video content) or samples (for intra-coded residual video content). If the inter-layer residual video (356) was motion-compensation predicted, the reconstructed prediction residuals are added to the motion-compensated predictors (368) to form the reconstructed inter-layer residual video. The picture store (364) buffers the reconstructed inter-layer residual video for use in subsequent motion-compensated prediction.

The entropy coder (384) compresses the output of the quantizer (382) as well as certain side information (e.g., quantization step size) Typical entropy coding techniques include arithmetic coding, differential coding, Huffman coding, run length coding, LZ coding, dictionary coding, and combinations of the above. The entropy coder (384) typically uses different coding techniques for different kinds of information, and can choose from among multiple code tables within a particular coding technique.

A controller (not shown) receives inputs from various modules such as the motion estimator (358), frequency transformer (380), quantizer (382), inverse quantizer (390), and entropy coder (384). The controller evaluates intermediate results during encoding, for example, setting quantization step sizes and performing rate-distortion analysis. The controller works with modules such as the motion estimator (358), frequency transformer (380), quantizer (382), and entropy coder (384) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation. In some embodiments, the controller also receives input from an encoding session wizard interface, from another encoder application interface, or from another source to designate video as having specific content with specific rules.

The above description explicitly addresses motion compensation for inter-layer residual video. The encoder (340) additionally performs intra-compression of the inter-layer residual video. In that instance, the scaler (354) provides inter-layer residual video (356) to the encoder (340) and the encoder intra-compresses it as an intra-coded picture, without motion compensation. Instead, the inter-layer residual video (356) is provided directly to the frequency transformer (380), quantizer (382), and entropy coder (384) and output as encoded video. A reconstructed version of the intra-coded inter-layer residual video can be buffered for use in subsequent motion compensation of other inter-layer residual video.

The relationships shown between modules within the encoder (340) indicate general flows of information in the encoder; other relationships are not shown for the sake of simplicity. In particular, FIGS. 2 and 3 generally do not show side information indicating modes, tables, etc. used for a video sequence, picture, macroblock, block, etc. Such side information, once finalized, is sent in the output bit stream, typically after entropy encoding of the side information.

Particular embodiments of video encoders typically use a variation or supplemented version of the inter-layer residual encoder (340). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

C. General Encoding Techniques.

Figure 4:
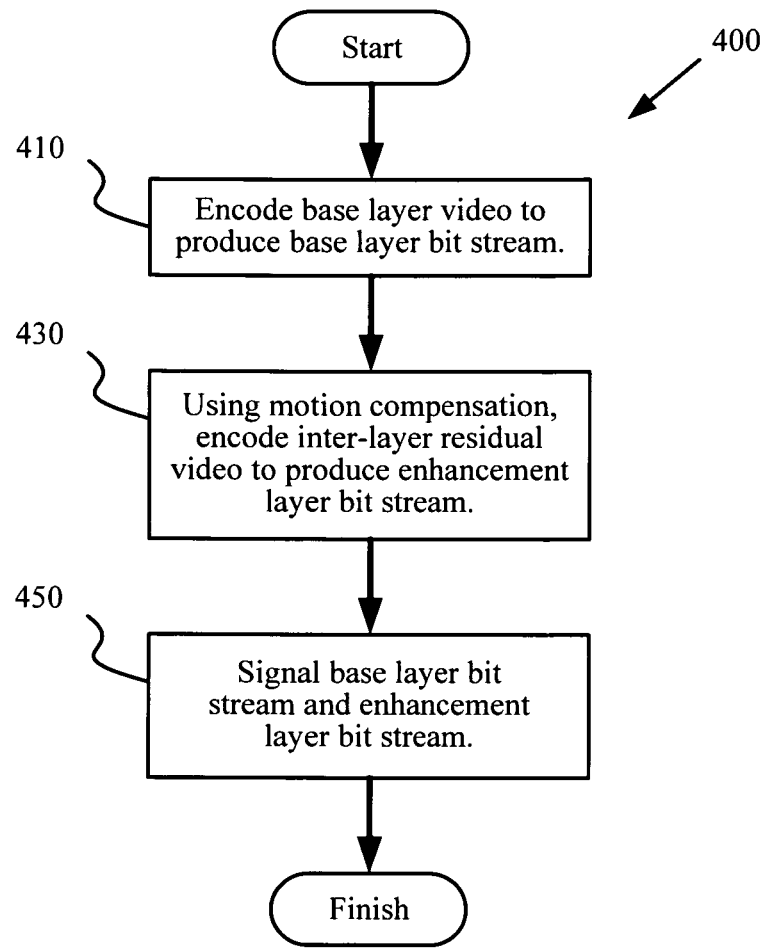
FIG. 4 is a flow chart of a generalized technique for scalable video encoding, including inter-layer residual prediction with motion compensation.

FIG. 4 shows a flow chart of a generalized technique (400) for scalable video encoding with inter-layer residual prediction using motion compensation. An encoding tool such as a tool (200, 300) described with reference to FIG. 2 or 3, or other tool, performs the technique (400).

Generally, the encoding tool accepts a base layer video picture and, at the first step, encodes (410) the base layer video picture to produce a base layer bit stream. For example, the bit stream is in a VC-1, MPEG-2, H.264, or other format.

In the next step, the tool encodes (430) inter-layer residual video using motion compensation to produce an enhancement layer bit stream. The enhancement layer bit stream may be in the same standard as the base layer bit stream, or some other format. Additionally, the inter-layer residual video may be downsampled before being encoded.

Finally, the tool signals (450) the base layer bit stream and the enhancement layer bit stream. As output, the two bit streams may be transmitted from the encoder or buffered for transmission at a later time. Additionally, each layer's bit stream may be transmitted in sequence or part of the layer's bit stream may be staggered with a part of another layer's bit stream. In other words, the entire base layer bit stream may be transmitted and then the entire enhancement layer bit stream may be transmitted or, alternatively, a part of the base layer bit stream (e.g., for a frame, slice, or macroblock at time t) may be transmitted followed by a part of the enhancement layer bit stream (e.g., for a frame, slice, or macroblock at time t).

D. Exemplary Encoding Techniques.

Figure 5:
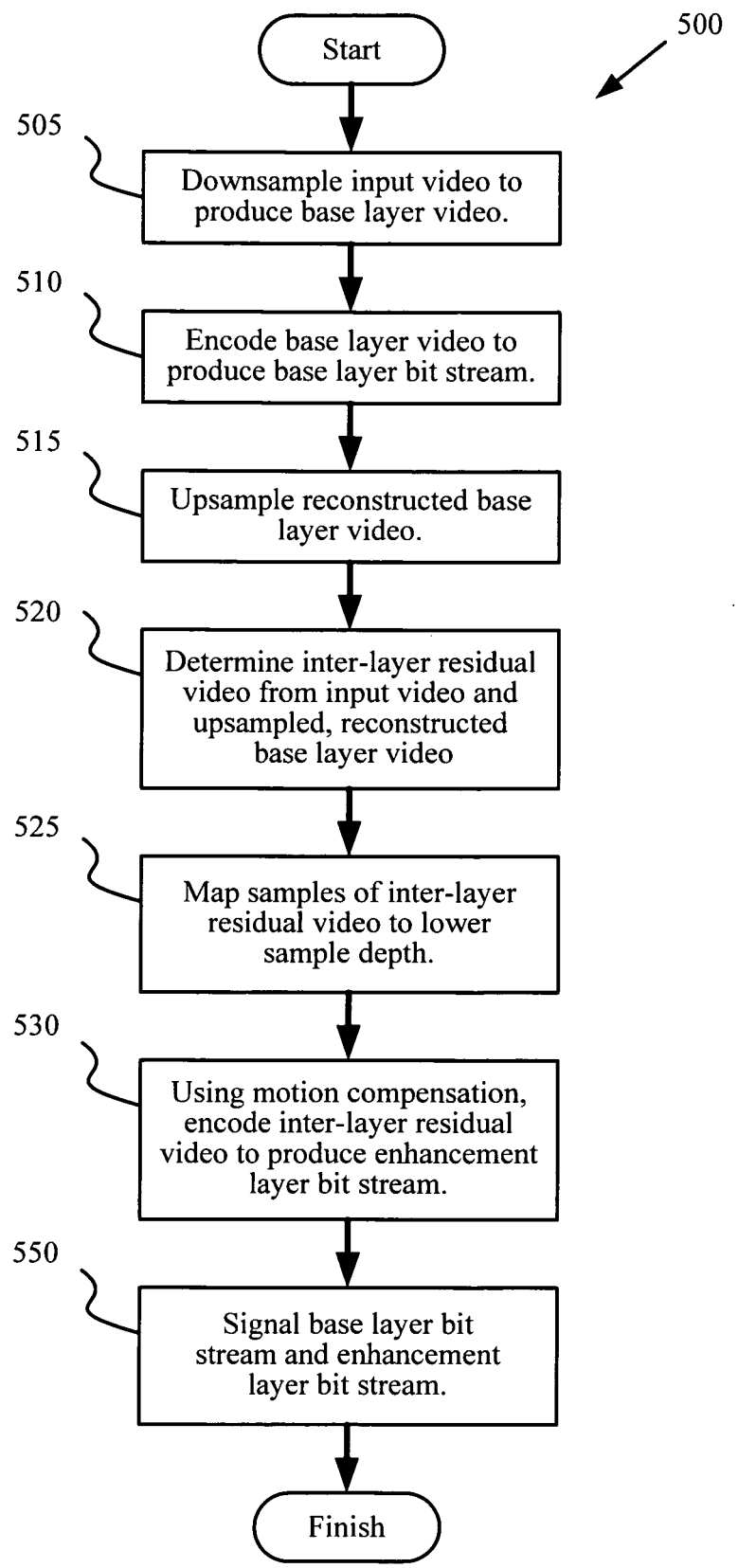
FIG. 5 is a flow chart of an exemplary technique for scalable video encoding, including inter-layer residual prediction with motion compensation.

FIG. 5 shows a flow chart of an exemplary technique (500) for encoding an inter-layer prediction residual $e_t$ at time t using motion compensation of inter-layer residual video. An encoding tool such as a tool (200, 300) described with reference to FIG. 2 or 3, or other tool, performs the technique (500).

In the following description, an apostrophe ' is used to indicate a reconstructed version of video content. So, for example, $B_t$ signifies base layer video at time t, and $B'_t$ signifies reconstructed base layer video at time t.

In the first step, the tool accepts input video and downsamples (505) it to produce base layer video $B_t$. For example, the tool downsamples the input video using clipping, tone mapping, simple scaling, or some other mechanism to map samples of the input video from one sample depth (e.g., 10 bits, 12 bits, 16 bits or 20 bits per sample) to another sample depth (e.g., 8 bits per sample). Alternatively, the input video may already be 8-bit video, in which case the video may not need to be downsampled. The tool can also downsample (505) or otherwise scale the input video in terms of spatial resolution, chroma sampling rate, or another factor.

The tool encodes (510) the base layer video $B_t$ and outputs the encoded base layer video in a base layer bit stream. The base layer bit stream can be a bit stream compliant with the VC-1 standard, the MPEG-2 standard, the H.264 standard, or some other standard.

Next, if the input video was downsampled (505), reconstructed base layer video $B'_t$ is correspondingly upsampled (515) to the same bit depth, spatial resolution, chroma sampling rate, etc. as the input video. Alternatively, if the input video was not downsampled because it was already at a desired resolution, then the reconstructed base layer video is not upsampled. In certain embodiments, the reconstructed base layer video $B'_t$ is produced by the encoder as a part of the encoding process. In other embodiments, a decoder within the encoding tool receives the base layer bit stream and decodes it to produce the reconstructed base layer video $B'_t$.

The tool uses the upsampled, reconstructed base layer video $B'_t$ and the input video to determine (520) inter-layer residual video $d_t$ from the input video and the upsampled, reconstructed base layer video $B'_t$. The inter-layer residual video $d_t$ at time t is determined by subtracting $B'_t$ from the original input video, which corresponds to the enhancement layer video frame $E_t$ at time t: $d_t=E_t-B'_t$.

After the inter-layer residual video $d_t$ is determined, the tool maps (525) samples of the inter-layer residual video $d_t$ to a lower bit depth. This is generally accomplished by applying an appropriate scaling operator, S, such that $d_t=S(E_t-B'_t)$. Mapping $d_t$ to a lower bit depth can simplify implementation if an off-the-shelf encoder accepts samples in the lower bit depth. In certain instances, however, it may not be necessary to map $d_t$ to a lower bit depth, depending on the encoding tools used to encode the inter-layer residual video. Generally, $d_t$ will be at the same bit depth as the input video. Alternatively, if a factor such as speed of encoding is determined to be more important than speed of implementation, mapping $d_t$ may also be undesirable.

The tool then encodes (530) the inter-layer residual video to produce an enhancement layer bit stream. The encoding can use a combination of intra-compression and inter-compression with motion compensation. When encoding inter-layer residual video $d_t$ at time t using motion compensation, the encoder uses buffered, previously reconstructed inter-layer residual video $d'_{t-1}$, known from previous encoding and decoding in the inter-layer residual video encoding. The encoder determines motion information (namely, motion vectors) for $d_t$ relative to $d'_{t-1}$ and any other reconstructed inter-layer residual video stored as reference pictures. The motion vectors, MV, are used to predict $d_t$ from the previously reconstructed inter-layer residual video (represented as $d'_{t-1}$). The motion-compensation predicted inter-layer residual video is $d'_{t-1}{}^{MV}$. The tool determines an inter-layer prediction residual $e_t$ as the difference between the motion-compensation predicted inter-layer residual $d'_{t-1}{}^{MV}$ and the inter-layer residual video $d_t$: $e_t=d_t-d'_{t-1}{}^{MV}$. The tool encodes the motion vectors MV and the inter-layer prediction residual $e_t$ and outputs them as part of the enhancement layer bit stream. Alternatively, the motion vectors MV and the inter-layer prediction residual $e_t$ are encoded and output separately from each other. The tool buffers a reconstructed version $d'_t$ of the inter-layer residual video at time t for use in subsequent motion compensation.

Finally, the tool signals (550) the base layer bit stream produced in step (510) and the enhancement layer bit stream produced in step (530). These bit streams may be transmitted to a separate decoder on the same physical machine or over a network, or the bit streams may be archived for later decoding.

IV. Motion-Compensated Prediction of Inter-Layer Residual Video in Decoding

This section describes example embodiments that use multiple motion compensation loops in decoding, one loop for decoding base layer video and the other loop for decoding inter-layer residual video.

A. Decoding.

Figure 6:
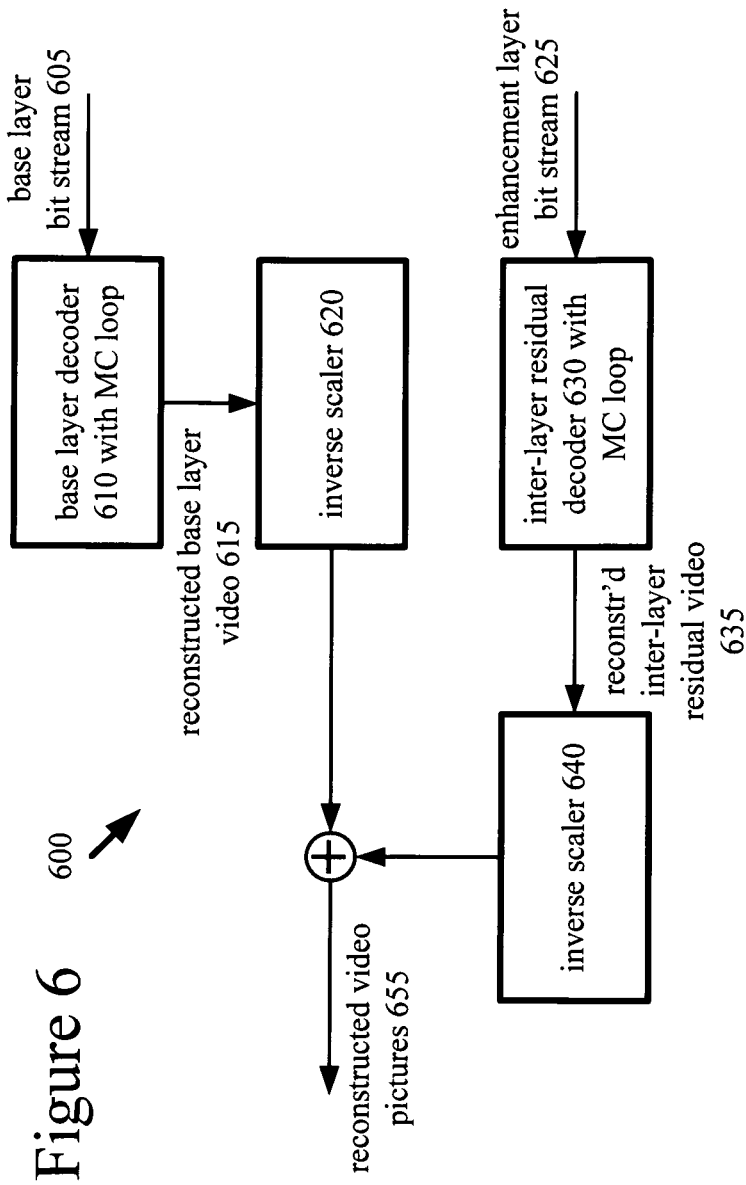
FIG. 6 is a block diagram of a generalized video decoding system for multi-loop, scalable decoding of base layer video and motion-compensated inter-layer residual video.

FIG. 6 is a block diagram of a generalized decoding system (600) in conjunction with which some described embodiments may be implemented. The system (600) receives an input base layer bit stream (605) and an enhancement layer bit stream (625) of compressed video information and produces reconstructed video pictures (655).

The base layer decoder (610) accepts the base layer bit stream (605) and outputs reconstructed base layer video (615). The base layer bit stream (605) can be a bit stream in a Windows Media Video or VC-1 format, MPEG-x format (e.g., MPEG-1, MPEG-2, or MPEG-4), H.26x format (e.g., H.261, H.262, H.263, or H.264), or other format. In certain embodiments, the base layer bit stream (605) is encoded using motion compensation, and thus the base layer decoder (610) includes a motion compensation loop.

The first inverse scaler (620) accepts reconstructed base layer video (615) and reverses scaling of the base layer video performed before encoding. In certain instances, input video pictures are downsampled in terms of sample depth, spatial resolution, chroma sampling rate, or another factor before encoding, and thus decoding of the decoded base layer bit stream (605) produces downsampled reconstructed base layer video (615). In such instances, the first inverse scaler (620) operates to upsample the reconstructed base layer video (615) to the bit depth, spatial resolution, chroma sampling rate, etc. of the original input video pictures. Or, if the input video pictures are upsampled before encoding, the first inverse scaler (620) operates to downsample the reconstructed base layer video (615) to the bit depth, spatial resolution, chroma sampling rate, etc. of the original input video pictures.

An inter-layer residual decoder (630) accepts the enhancement layer bit stream (625) and outputs reconstructed inter-layer residual video (635). Because the inter-layer residual video was motion compensated during encoding, the inter-layer residual decoder (630) includes a motion compensation loop. The enhancement layer bit stream (625) can be the same format as the base layer bit stream (605), or it may be a different format.

A second inverse scaler (640) accepts the reconstructed inter-layer residual video (635) and, in some cases, upsamples the reconstructed inter-layer residual video (635). For example, when the inter-layer residual video is downsampled to a lower bit depth prior to encoding, the inverse scaler (640) restores samples of the inter-layer residual video to the original bit depth of the input video pictures. Generally, samples of the inter-layer residual video can be mapped to a lower bit depth (e.g., 8 bits per sample) or chroma sampling resolution for conventional enhancement layer encoding/decoding tools, in which case the inter-layer residual video samples are restored to the higher resolution after decoding. As another example, when the inter-layer residual video is upsampled to a higher bit depth prior to encoding, the second inverse scaler (640) restores samples of the inter-layer residual video to the original bit depth of the input video pictures by downsampling. The second inverse scaler (640) may be the same physical or software component as the first inverse scaler (620), or it may be different. If the reconstructed inter-layer residual video (635) is already at the desired resolution, then upsampling may not be necessary and the second inverse scaler (640) does not alter the reconstructed inter-layer residual video.

The tool combines the inverse scaled, reconstructed base layer video from the first inverse scaler (620) and the inverse scaled, reconstructed inter-layer residual video from the second inverse scaler (640) to form reconstructed video pictures (655), which are output from the system (600) as reconstructed output video.

In some implementations, the decoding system (600) accepts multiple enhancement layer bit streams and includes multiple decoders for the respective enhancement layer bit streams. If the inter-layer residual video is itself decomposed or otherwise separated into multiple layers of video and then encoded with separate residual encoders, the decoding system includes (600) one or more corresponding residual decoders. For example, if the inter-layer residual video is split into a layer of sample depth residual video and a layer of chroma sampling rate residual video, which are encoded with separate encoders, the decoding system includes a residual decoder for the sample depth residual video and/or a residual decoder for the chroma sampling rate residual video. The decoding system (600) combines the inverse scaled, reconstructed base layer video from the first inverse scaler (620) with one or more of the inverse scaled, reconstructed layers of residual video (potentially after composing or otherwise combining reconstructed residual video for multiple enhancement layers) to form reconstructed video pictures (655), which are output from the system (600). Generally, the inter-layer residual video that is decoded represents differences (but not necessarily all differences) between the reconstructed base layer video and the original video.

The bit depths of the various layers at different stages of processing depend on implementation. Example source video formats generally have bit depths that are 12 bits per sample, 10 bits per sample, or 8 bits per sample. Typical base layer decoders work with 8-bit video, but some base layer decoders also work with higher bit depths, in which case the base layer has a format of other than 8-bit samples. The inter-layer residual decoder can also operate on video with a higher bit depth.

B. Exemplary Decoding Tool.

Figure 7:
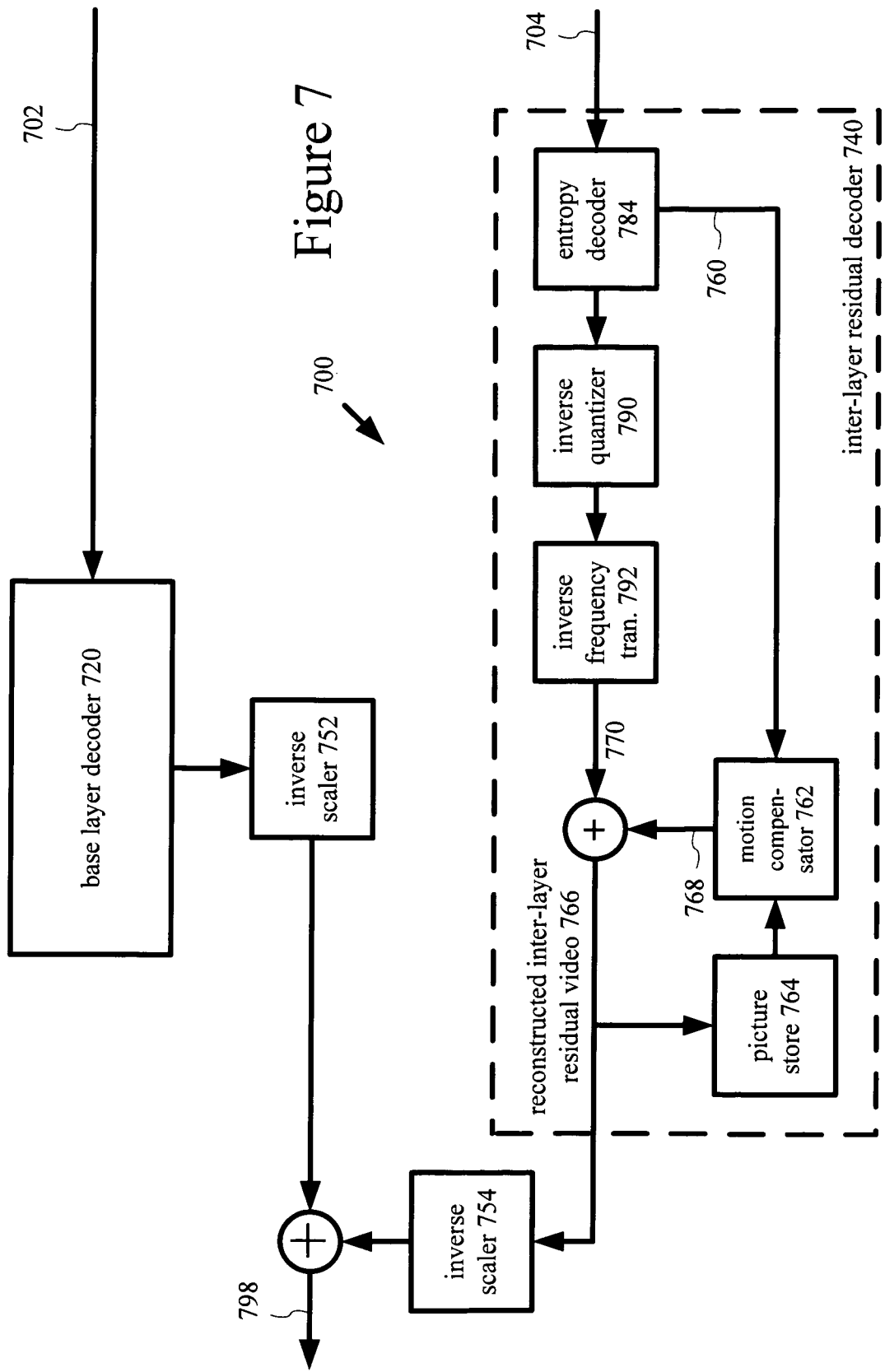
FIG. 7 is a block diagram of an exemplary video decoding system for multi-loop, scalable decoding of base layer video and motion-compensated inter-layer residual video, showing modules of an inter-layer residual decoder.

FIG. 7 is a block diagram of a decoding system (700), including an exemplary inter-layer residual decoder (740), in conjunction with which some described embodiments may be implemented. The system (700) includes a base layer decoder (720) which receives a base layer bit stream (702) and outputs reconstructed base layer video to a first inverse scaler (752). The first inverse scaler (752) is operable to upsample or otherwise inverse scale the reconstructed base layer video to the desired bit depth, spatial resolution, chroma sampling rate and/or other resolution of the output reconstructed video pictures (798).

The system further includes an inter-layer residual decoder (740) operable to receive an enhancement layer bit stream (704). The entropy decoder (784) is operable to decode elements of the bit stream that were encoded by entropy encoding methods including arithmetic coding, differential coding, Huffman coding, run length coding, LZ coding, dictionary coding, and combinations of the above. The entropy decoder (784) typically uses different decoding techniques for different kinds of information, and can choose from among multiple code tables within a particular decoding technique. The entropy decoder (784) outputs side information such as motion vector information (760) to a motion compensator (762).

An inverse quantizer (790) applies inverse quantization to the output of the entropy decoder (784). In certain embodiments, the inverse quantizer (790) is operable to reverse non-uniform scalar quantization with a step size that varies on a picture-by-picture basis, macroblock-by-macroblock basis, or some other basis. More generally, the inverse quantizer (790) is operable to reverse quantization applied during encoding.

An inverse frequency transformer (792) accepts the output of the inverse quantizer (790). The inverse frequency transformer (792) is operable to produce blocks of spatial domain values by applying an inverse DCT, variant of inverse DCT, or other reverse block transform to the output of the inverse quantizer (790). The inverse frequency transformer (792) may be operable to reverse an 8×8, 8×4, 4×8, 4×4 or some other size frequency transform. The inverse frequency transformer (792) outputs reconstructed values (770) for a prediction residual (in the case of inter-coded inter-layer residual video content) or samples (in the case of intra-coded inter-layer residual video content).

The motion vector information (760) output from the entropy decoder (784) is input to a motion compensator (762). The motion compensator (762) applies the motion vector information to previously reconstructed inter-layer residual video buffered in a picture store (764) and outputs motion-compensation-predicted inter-layer residual video (768).

In decoding of inter-coded inter-layer residual video, the motion-compensation-predicted inter-layer residual video (768) is combined with the prediction residual (770) to form reconstructed inter-layer residual video (766). The reconstructed inter-layer residual video (766) is buffered by the picture store (764) (for use in subsequent motion compensation) and output from the inter-layer residual decoder (740) to a second inverse scaler (754).

The inter-layer residual decoder (740) may be operable to decode 8-bit video, 10-bit video, or video with some other bit depth. If the inter-layer residual decoder (740) decodes 8-bit video and output video with a higher bit depth (e.g., 10-bit) is to be reconstructed, then the second inverse scaler (754) upsamples the reconstructed inter-layer residual video (766) to the higher bit depth. Or, if the inter-layer residual decoder (740) decodes 16-bit video and output video with a lower bit depth (e.g., 8-bit) is to be reconstructed, then the second inverse scaler (754) downsamples the reconstructed inter-layer residual video (766) to the lower bit depth. The decoding tool combines the inverse scaled, reconstructed inter-layer residual video output from the second inverse scaler (754) with the inverse scaled, reconstructed base layer video output by the first inverse scaler (752), to produce reconstructed video pictures (798) for the output video.

The above description explicitly addresses decoding of inter-coded inter-layer residual video. The decoder (740), using intra-decoding, also decodes intra-coded inter-layer residual video. In that instance, the entropy decoder (784), inverse quantizer (790), and inverse frequency transformer (792) act as previously mentioned to produce samples of the inter-layer residual video, bypassing motion compensation. The reconstructed inter-layer residual video (766) is buffered in a picture store (764) for use in future motion compensation.

The relationships shown between modules within the decoder (740) indicate general flows of information in the decoder; other relationships are not shown for the sake of simplicity. In particular, FIGS. 6 and 7 generally do not show side information indicating modes, tables, etc. used for a video sequence, picture, macroblock, block, etc.

Particular embodiments of video decoders typically use a variation or supplemented version of the generalized decoder (740). Depending on implementation and the type of compression desired, modules of the decoder can be added, omitted, split into multiple modules, combined with other modules, and/or replaced with like modules. In alternative embodiments, decoders with different modules and/or other configurations of modules perform one or more of the described techniques.

Although FIG. 7 shows a single inter-layer residual decoder (740), the inter-layer residual video can itself be separated into multiple layers of residual video for encoding with separate residual encoders and signaling as multiple enhancement layer bit streams. A given decoding system includes one or more separate residual decoders for decoding one or more of the multiple enhancement layer bit streams. Generally, the inter-layer residual video that is decoded represents differences (but not necessarily all differences) between the reconstructed base layer video and the original input video.

C. General Decoding Techniques.

Figure 8:
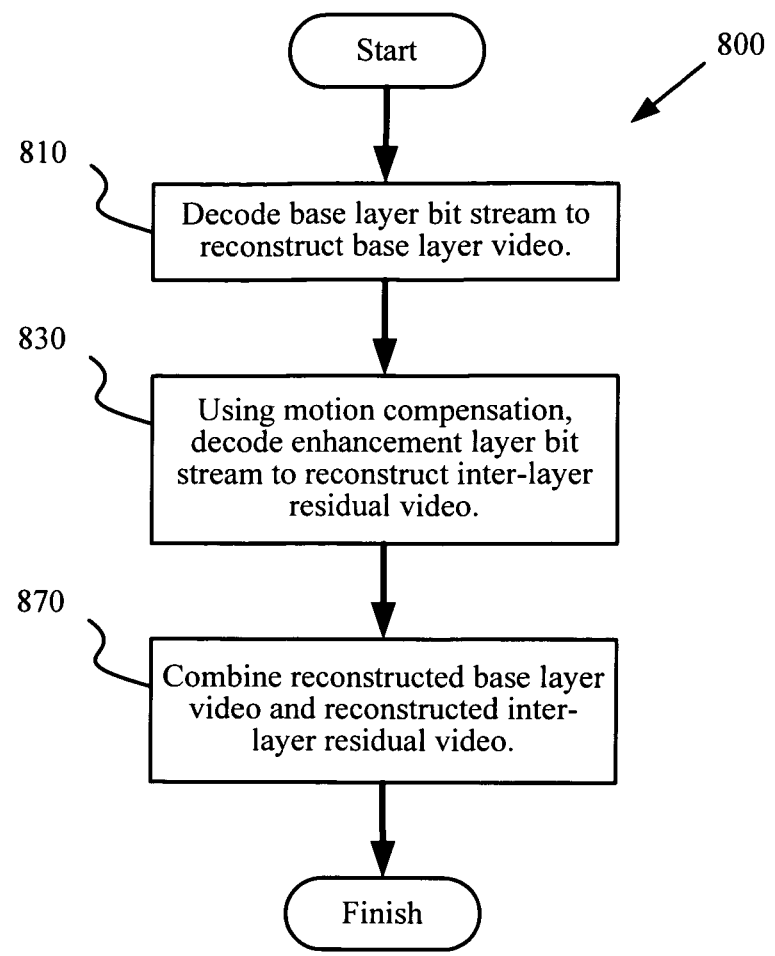
FIG. 8 is a flow chart of a generalized technique for scalable video decoding, including inter-layer residual prediction with motion compensation.

FIG. 8 shows a flow chart of a generalized technique (800) for scalable video decoding with inter-layer residual prediction using motion compensation. A decoding tool such as a tool (600, 700) described with reference to FIG. 6 or 7, or other tool, performs the technique (800). Generally, the tool accepts a base layer bit stream and decodes (810) the base layer bit stream to reconstruct base layer video. The base layer bit stream may be decoded according to a standard such as VC-1, MPEG-2, H.264, or some other standard.

The tool also decodes (830) an enhancement layer bit stream using motion compensation to reconstruct inter-layer residual video. One or both of the inter-layer residual video or the base layer video may have been downsampled (or otherwise scaled) before being encoded, and therefore may need to be upsampled (or otherwise inverse scaled) after being decoded. The enhancement layer bit stream may be decoded according to a standard such as VC-1, MPEG-2, H.264, or some other standard. The base layer bit stream and enhancement layer bit stream may be decoded with the same type of decoder or different types of decoders.

Finally, the tool combines (870) the reconstructed (and possibly upsampled) base layer video with the reconstructed (and possibly upsampled) inter-layer residual video, and outputs reconstructed video. In one embodiment, a certain portion (e.g., for a frame or a number of macroblocks) of the base layer bit stream is decoded, followed by a certain portion (e.g., for a frame or a number of macroblocks) of the enhancement layer bit stream being decoded. In another embodiment, the entire base layer bit stream is decoded followed by the entire enhancement layer bit stream being decoded.

D. Exemplary Decoding Techniques.

Figure 9:
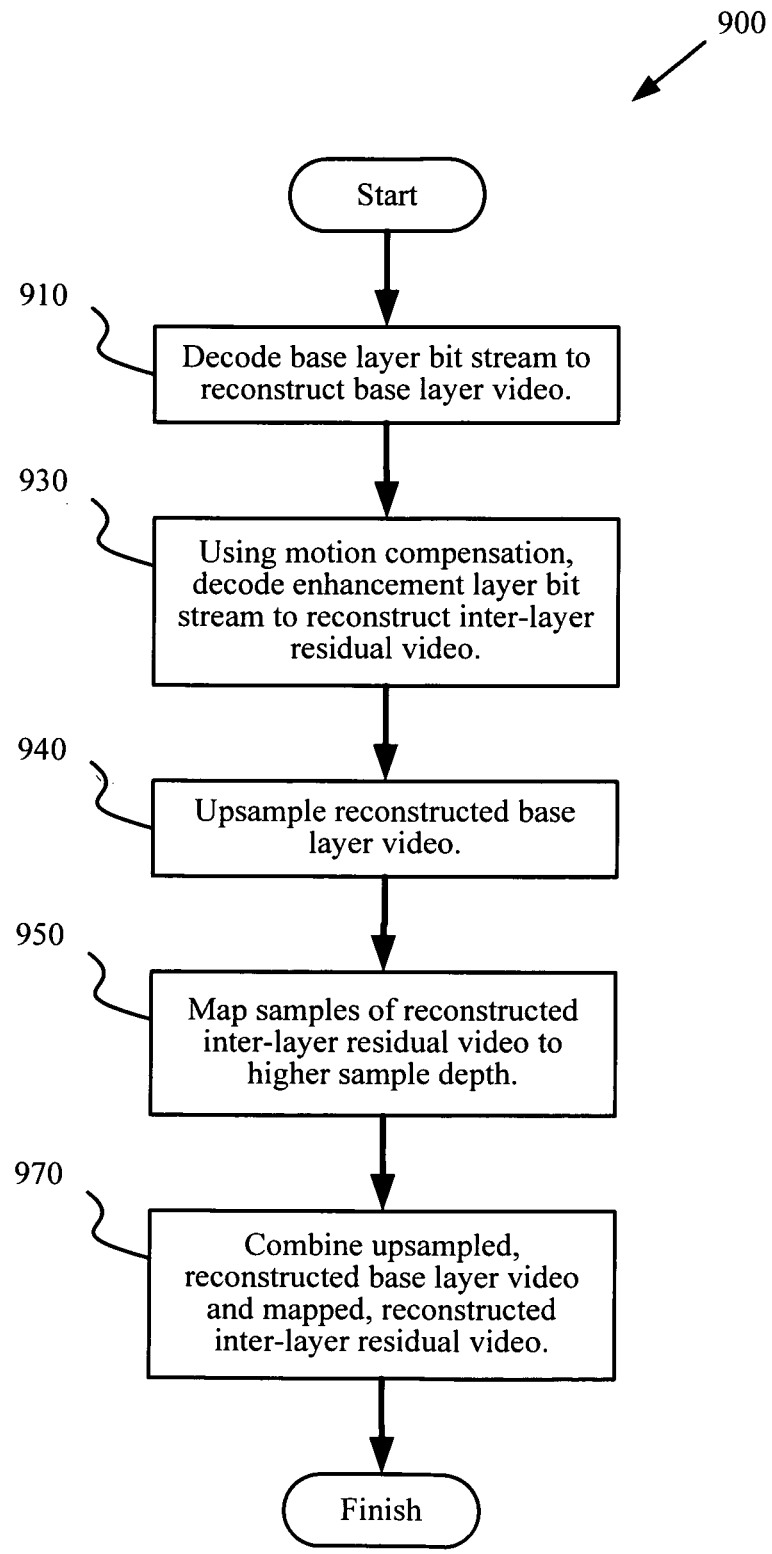
FIG. 9 is a flow chart of an exemplary technique for scalable video decoding, including inter-layer residual prediction with motion compensation.

FIG. 9 shows a flow chart of an exemplary technique (900) for scalable video decoding with inter-layer residual prediction using motion compensation. A decoding tool such as a tool (600, 700) described with reference to FIG. 6 or 7, or other tool, performs the technique (900).

The decoding tool receives and decodes (910) a base layer bit stream to reconstruct base layer video, including a current base layer video frame $B'_t$. The base layer video bit stream may be decoded according to the VC-1 standard, MPEG-2 standard, H.264 standard, or some other standard.

The tool uses motion compensation to decode (930) the enhancement layer bit stream to reconstruct inter-layer residual video. The enhancement layer bit stream is decoded according to the same standard as the base layer bit stream or according to a different standard, depending on how it was encoded. The enhancement layer bit stream includes encoded motion vectors MV for the inter-layer residual video, for example, motion vectors for blocks or macroblocks of inter-layer residual video $d'_t$ at time t. The enhancement layer bit stream also includes encoded video content for motion-compensated prediction residuals for the inter-layer residual video, such as inter-layer prediction residual $e'_t$. In certain embodiments, the enhancement layer bit stream comprises two separate bit streams, one of which is decodable to reconstruct the motion vectors MV for the inter-layer residual video, and the other of which decodable to reconstruct the inter-layer prediction residual $e'_t$.

The tool applies the reconstructed motion vectors MV for the inter-layer residual video $d'_t$ to buffered, previously reconstructed inter-layer residual video (represented as $d'_{t-1}$) to produce a motion-compensation predicted inter-layer residual video $d'^{MV}_{t-1}$. The tool reconstructs the current inter-layer residual video $d'_t$ by combining the reconstructed inter-layer prediction residual $e'_t$ with the motion-compensated prediction $d'^{MV}_{t-1}$: $d'_t = e'_t + d'^{MV}_{t-1}$.

Next, if the input video was downsampled (or otherwise scaled) prior to encoding, the tool upsamples (940) (or otherwise inverse scales) the reconstructed base layer video $B'_t$ to the same bit depth, spatial resolution, chroma sampling rate, etc. as the input video. Many conventional video encoders and decoders typically operate to encode/decode 8-bit video. In some cases, the input video may have been a higher bit depth such at 10-bit video, 12-bit video, or 16-bit video. In such cases, the tool upsamples $B'_t$ to the higher bit depth of the input video. Alternatively, if the input video was not downsampled because it was already at a desired resolution, then the reconstructed base layer video is not upsampled.

Similarly, the inter-layer residual video may have been downsampled (or otherwise scaled, e.g., to 8 bits per sample) prior to encoding. If so, the tool maps (950) the reconstructed inter-layer residual video to the higher bit depth (e.g., to 10 bits per sample) of the input video or otherwise inverse scales the inter-layer residual video.

The tool combines (970) the reconstructed (and possibly re-mapped) inter-layer residual video with the reconstructed (and possibly inverse scaled) base layer video to output reconstructed, enhancement layer video: $E'_t = d'_t + B'_t$. The base layer and reconstructed video can be combined on a frame-by-frame basis, macroblock-by-macroblock basis, or according to some other basis. In some implementations, the inter-layer residual video is itself separated into multiple layers of residual video, and the tool decodes one of the layers, or decodes and combines multiple layers, before combining the reconstructed enhancement layer video with the reconstructed base layer video.

V. Conclusion

The encoding and decoding techniques of FIGS. 5 and 9 illustrate some of the advantages of motion compensation of inter-layer residual video. Specifically, encoding and decoding of the inter-layer residual video can be separated from encoding and decoding of the base layer video. Dependencies of inter-layer residual video encoding/decoding on the motion vectors, motion-compensated prediction residuals, and macroblock organization of the base layer encoding/decoding can be avoided. Separate standards can even be used for each of the base layer video and the inter-layer residual video.

The encoding/decoding of the inter-layer residual video (for the enhancement layer video coding/decoding to reconstruct output video) does not depend on the motion vectors of the base layer. The inter-layer residual video is encoded/decoded according to the inter-layer residual video's own motion vectors, rather than both layers relying on motion vectors that may be optimal for one layer but not optimal for the other layer. Thus, both the base layer video and the inter-layer residual video can have improved encoding quality in terms of rate-distortion performance.

Another advantage is that if the base layer video and the inter-layer residual video (and the input video/output video) have different spatial resolutions, spatial upsampling is performed on the reconstructed base layer video, outside of the decoding loop for the inter-layer residual video. The base layer video is upsampled to the same spatial resolution as the inter-layer residual video. This upsampling is done to each reconstructed base layer video picture, and the complications relating to upsampling across block boundaries in single-loop approaches are avoided. This facilitates determination of the residual signal for motion-compensation-predicted inter-layer residual video in the pixel domain rather than the transform domain, which can be more accurate and desirable in certain instances.

Finally, scaling inter-layer residual video before encoding so as to reduce sample depth can reduce memory requirements for encoding and decoding of the inter-layer residual video, in addition to simplifying implementation with conventional encoding and decoding tools. For example, many conventional encoding and decoding tools work with video having 8 bits per sample. Scaling the inter-layer residual video to 8 bits per sample results in buffering of reconstructed inter-layer residual video with 8 bits per sample (as opposed to 10 bits per sample, 12 bits per sample, etc.), which reduces the memory used to store reference pictures for subsequent motion compensation.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
    encoding base layer video to produce at least part of a base layer bit stream;
    scaling inter-layer residual video that represents differences between the base layer video and an input video, including scaling samples of the inter-layer residual video from a first sample depth to a second sample depth lower than the first sample depth;
    encoding the scaled inter-layer residual video at the second sample depth to produce at least part of an enhancement layer bit stream, wherein the encoding the scaled inter-layer residual video includes sample-domain prediction of blocks or macroblocks of a current picture of the scaled inter-layer residual video relative to one or more reference pictures of previously reconstructed scaled inter-layer residual video, and wherein the sample-domain prediction uses motion compensation of the blocks or macroblocks of the current picture of the scaled inter-layer residual video relative to the one or more reference pictures of the previously reconstructed scaled inter-layer residual video; and
    signaling the at least part of the base layer bit stream and the at least part of the enhancement layer bit stream, wherein the enhancement layer bit stream includes motion information for the blocks or macroblocks of the current picture of the scaled inter-layer residual video.

2. The method of claim 1 further comprising, on a picture-by-picture basis:
    after the encoding the base layer video, determining the inter-layer residual video using reconstructed base layer video and the input video.

3. The method of claim 1 further comprising:
    before the encoding the base layer video, scaling the input video to produce the base layer video;
    inverse scaling a reconstructed version of the base layer video; and
    determining the inter-layer residual video as sample-by-sample differences between the input video and the inverse scaled, reconstructed base layer video.

4. The method of claim 3 wherein the scaling the input video comprises downsampling, and wherein the inverse scaling the reconstructed version of the base layer video comprises upsampling.

5. A method comprising:
    decoding at least part of a base layer bit stream to reconstruct base layer video;
    decoding at least part of an enhancement layer bit stream to reconstruct inter-layer residual video that represents differences between the base layer video and an input video from encoding, including using motion compensation to predict blocks or macroblocks of a current picture of the inter-layer residual video relative to one or more reference pictures of previously reconstructed inter-layer residual video, wherein the enhancement layer bit stream includes motion information for the blocks or macroblocks of the current picture of the inter-layer residual video, the motion information indicating motion relative to the one or more reference pictures of the previously reconstructed inter-layer residual video, and wherein the motion information for the blocks or macroblocks of the current picture of the inter-layer residual video differs from motion information for blocks or macroblocks of the base layer video;
    inverse scaling the reconstructed inter-layer residual video, including inverse scaling samples of the reconstructed inter-layer residual video to a higher sample depth after the reconstruction of the inter-layer residual video at a lower sample depth; and
    combining the reconstructed base layer video and the inverse scaled, reconstructed inter-layer residual video to reconstruct output video.

6. The method of claim 5 further comprising:
    buffering the reconstructed inter-layer residual video for use as a reference picture in motion compensation to predict one or more subsequent pictures of the inter-layer residual video relative to the buffered, reconstructed inter-layer residual video.

7. The method of claim 5 further comprising, before the combining, inverse scaling the reconstructed base layer video.

8. The method of claim 7 wherein the reconstructed base layer video and the reconstructed inter-layer residual video have different resolutions, and wherein the inverse scaling the reconstructed base layer video comprises upsampling the reconstructed base layer video to a higher resolution.

9. The method of claim 7 wherein the reconstructed output video and the reconstructed inter-layer residual video have different sample depths.

10. The method of claim 2 wherein the enhancement layer bit stream includes transform coefficient data for motion compensation residuals for the current picture of the inter-layer residual video, and wherein the decoding the at least part of the enhancement layer bit stream further includes:
    decoding the motion compensation residuals for the current picture of the inter-layer residual video; and
    combining the motion compensation residuals for the current picture of the inter-layer residual video with the motion-compensated prediction for the current picture of the inter-layer residual video.

11. The method of claim 5 wherein a first decoding loop includes the decoding the at least part of the base layer bit stream, and wherein a second decoding loop separate from the first decoding loop includes the decoding the at least part of the enhancement layer bit stream.

12. The method of claim 5 further comprising repeating the decoding at least part of the base layer bit stream, the decoding at least part of the enhancement layer bit stream, and the combining on a picture-by-picture basis.

13. A computing system comprising a processor, memory and storage that stores computer-executable instructions for causing the system to implement:

a base layer decoder for decoding base layer video from a base layer bit stream;

an inter-layer prediction residual decoder for decoding inter-layer residual video that represents differences between the base layer video and an input video from encoding, wherein the inter-layer prediction residual decoder includes:

a buffer for storing one or more reference pictures of previously reconstructed inter-layer residual video; and a motion compensator for predicting blocks or macroblocks of a current picture of the inter-layer residual video relative to the one or more reference pictures of the previously reconstructed inter-layer residual video using motion information for the blocks or macroblocks of the current picture of the inter-layer residual video from an enhancement layer bit stream;

an inverse scaler for inverse scaling the inter-layer residual video, including inverse scaling samples of the inter-layer residual video from a first sample depth to a second sample depth higher than the first sample depth; and means for combining the base layer video and the inverse scaled inter-layer residual video to reconstruct output video.

14. The computing system of claim 13 wherein the inter-layer prediction residual decoder further includes:

an entropy decoder, inverse quantizer and inverse frequency transformer for decoding motion compensation residuals for the current picture of the inter-layer residual video; and means for combining the motion compensation residuals for the current picture of the inter-layer residual video with the motion-compensated prediction for the current picture of the inter-layer residual video.

15. The computing system of claim 13 wherein the base layer decoder includes:

a buffer for storing one or more reference pictures of previously reconstructed base layer video; and a motion compensator for predicting blocks or macroblocks of a current picture of the base layer video relative to the one or more reference pictures of the previously reconstructed base layer video.

* * * * *